(12) United States Patent
Shirae et al.

(10) Patent No.: US 9,069,597 B2
(45) Date of Patent: Jun. 30, 2015

(54) OPERATION MANAGEMENT DEVICE AND METHOD FOR JOB CONTINUATION USING A VIRTUAL MACHINE

(75) Inventors: Toshiyuki Shirae, Kanazawa (JP); Masahiro Tamura, Kanazawa (JP); Hideyuki Kametani, Kanazawa (JP); Yoshihiro Mizuuchi, Kanazawa (JP)

(73) Assignee: FUJITSU LIMITED, Kawasaki (JP)

( * ) Notice: Subject to any disclaimer, the term of this patent is extended or adjusted under 35 U.S.C. 154(b) by 457 days.

(21) Appl. No.: 12/972,680

(22) Filed: Dec. 20, 2010

(65) Prior Publication Data
US 2011/0154332 A1 Jun. 23, 2011

(30) Foreign Application Priority Data
Dec. 22, 2009 (JP) ................................ 2009-291388

(51) Int. Cl.
G06F 9/455 (2006.01)
G06F 11/00 (2006.01)
(52) U.S. Cl.
CPC .. G06F 9/45558 (2013.01); *G06F 2009/45575* (2013.01)
(58) Field of Classification Search
None
See application file for complete search history.

(56) References Cited

U.S. PATENT DOCUMENTS

| | | | |
|---|---|---|---|
| 7,779,297 B2 | 8/2010 | Nishii et al. | |
| 8,307,239 B1 * | 11/2012 | Keith, Jr. | 714/4.11 |
| 2005/0108593 A1 * | 5/2005 | Purushothaman et al. | 714/4 |
| 2006/0155912 A1 * | 7/2006 | Singh et al. | 711/6 |
| 2007/0174658 A1 * | 7/2007 | Takamoto et al. | 714/4 |
| 2007/0192765 A1 * | 8/2007 | Shimogawa et al. | 718/1 |
| 2008/0098154 A1 * | 4/2008 | Traut et al. | 711/6 |
| 2008/0294933 A1 * | 11/2008 | Nishii et al. | 714/5 |
| 2009/0113109 A1 * | 4/2009 | Nelson et al. | 711/6 |
| 2009/0276772 A1 * | 11/2009 | Garrett et al. | 718/1 |
| 2010/0058342 A1 * | 3/2010 | Machida | 718/1 |
| 2010/0107158 A1 * | 4/2010 | Chen et al. | 718/1 |
| 2010/0325471 A1 * | 12/2010 | Mishra et al. | 714/3 |

FOREIGN PATENT DOCUMENTS

| | | |
|---|---|---|
| JP | 2007-219757 A | 8/2007 |
| JP | 2008-293245 A | 12/2008 |

OTHER PUBLICATIONS

Japanese Office Action mailed Nov. 12, 2013 for corresponding Japanese Application No. 2009-291388, with Partial English-language Translation.

* cited by examiner

*Primary Examiner* — Tammy Lee
(74) *Attorney, Agent, or Firm* — Fujitsu Patent Center

(57) ABSTRACT

When hardware failure occurs in an operation device, a provisional job executing unit of a virtual machine is allowed to temporarily execute a job until setup of a spare device as an alternative job execution device is completed. Start of operation of the virtual machine is performed in a short time by shift from a suspending state to an operating state. Therefore, execution of the job is not stopped by the hardware failure of the operation device and it is possible to improve continuity of the job and improve reliability of a redundant configuration of the job execution device in which the spare device is associated with the operation device.

16 Claims, 13 Drawing Sheets

| SPARE SERVER NAME | ORIGINAL SERVER NAME BEFORE SWITCHING | BACKUP IMAGE NAME | PROVISIONAL JOB FLAG |
|---|---|---|---|
| spare_server01 | server01 | backup_imageA | TRUE |
| spare_server02 | server02 | backup_imageB | TRUE |
| spare_server03 | server03 | - | FALSE |
| spare_server04 | server04 | - | FALSE |
| spare_server05 | server05 | backup_imageE | FALSE |

FIG.5

```
name = "rhel53"
uuid = "7bb247b0-9787-3251-11f9-3196759427c2"
maxmem = 1024
memory = 1024
vcpus = 1
builder = "hvm"
kernel = "/usr/lib/xen/boot/hvmloader"
boot = "c"
pae = 0
acpi = 1
apic = 1
localtime = 1
on_poweroff = "destroy"
on_reboot = "restart"
on_crash = "restart"
device_model = "/usr/lib/xen/bin/qemu-dm"
sdl = 0
vnc = 1
vncunused = 1
disk = [ "backup_imageA" ]
vif = [ "mac=00:16:3e:5a:e9:91,bridge=xenbr1" ]
serial = "pty"
```

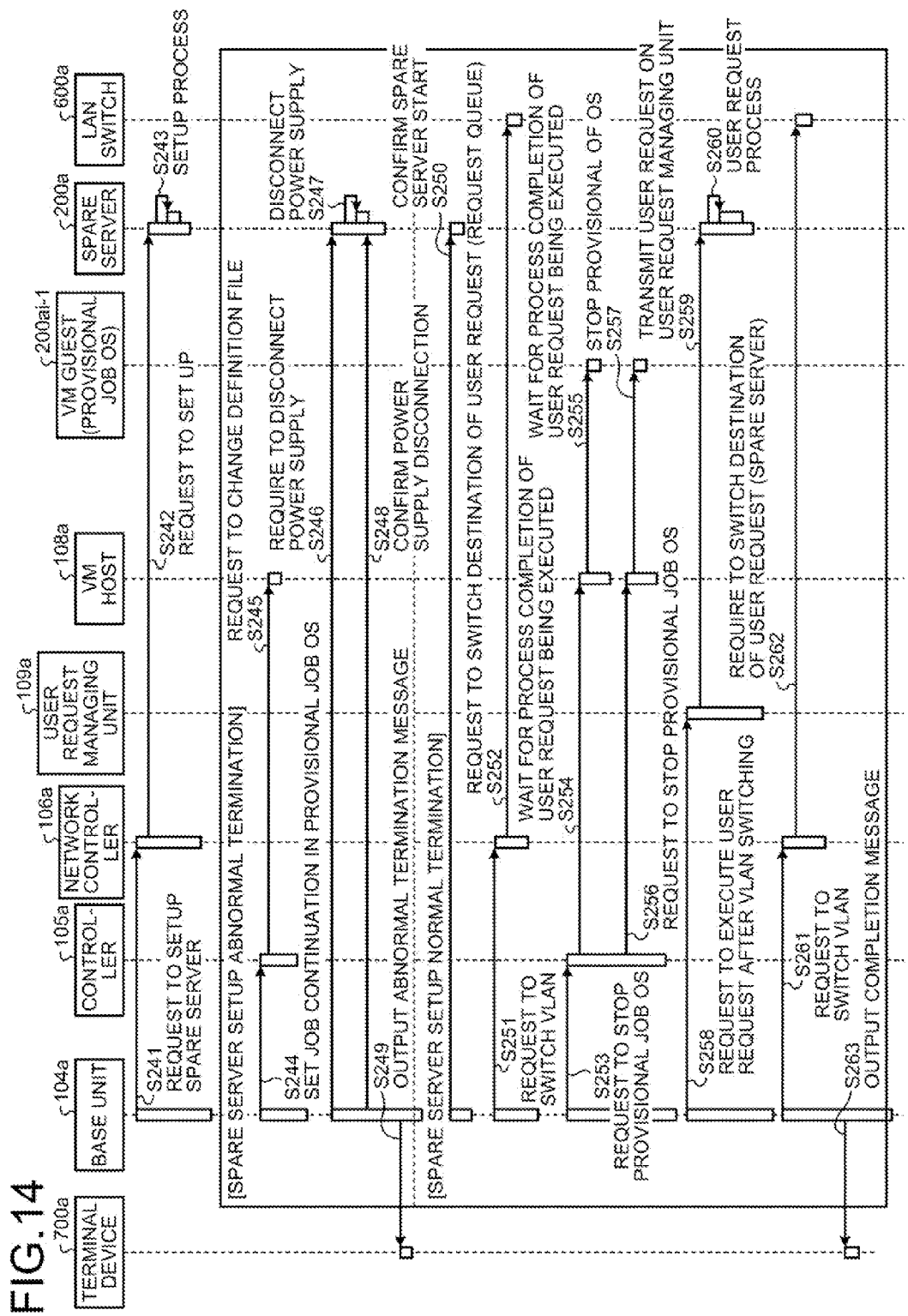

OPERATION MANAGEMENT DEVICE AND METHOD FOR JOB CONTINUATION USING A VIRTUAL MACHINE

CROSS-REFERENCE TO RELATED APPLICATION

This application is based upon and claims the benefit of priority of the prior Japanese Patent Application No. 2009-291388, filed on Dec. 22, 2009, the entire contents of which are incorporated herein by reference.

FIELD

The embodiments discussed herein are directed to an operation management device and an operation management method.

BACKGROUND

A redundant configuration method of an operation server in which a spare server is set in advance for an operation server for executing a job and the spare server is allowed to automatically take over the job executed by the operation server in a case in which failure occurs in the operation server is conventionally known. Also, a method of realizing the operation server and the spare server on a virtual machine is known. The virtual machine is a virtual electronic computer in which computer hardware of a virtual computer system is logically divided and each of them operates independently.

When the operation server and the spare server are realized on the virtual machine, an operating system (OS) of the virtual machine of an operation system for executing the job is copied in advance to memory means of a spare virtual machine. The spare virtual machine has the same function as the virtual machine of the operation system by being operated by the OS copied to the memory means. Then, the spare virtual machine takes over the job performed by the virtual machine of the operation system when the failure occurs in the OS of the virtual machine of the operation system.

Patent Document: Japanese Laid-open Patent Publication No. 2007-219757

In the conventional art, the virtual machine of the operation system and the spare virtual machine operate on the same hardware. Therefore, when the occurred failure is attributed to the hardware, it is required to continue the job by allowing different hardware to take over the job as the spare server.

However, switching from the virtual machine of the operation server or the operation system to the spare server is accompanied with a copy process of the OS from the virtual machine of the operation server or the operation system to the spare server. Then, after the copy process of the OS is terminated, the spare server operates. Since the copy process of the OS takes a lot of time, the job stops during the same. Therefore, in a system in which continuity of the job is important, the continuity of the job is not sufficiently assured.

SUMMARY

According to an aspect of an embodiment of the invention, an operation management device includes a saving and copying unit that saves and copies a job execution environment operating in an operation device for executing job to a predetermined memory device; a creation instructing unit that instructs a virtual machine management device to create a virtual machine in which the job execution environment saved and copied to the predetermined memory device by the saving and copying unit operates on predetermined computer hardware; a suspension shift instructing unit that instructs the virtual machine management device to start the virtual machine created on the predetermined computer hardware by the virtual machine management device according to the instruction of the creation instructing unit and thereafter shift the virtual machine to a suspending state; a failure information receiving unit that receives failure information transmitted from the operation device when failure occurs in the operation device; an operation shift instructing unit that instructs the virtual machine management device to shift the virtual machine shifted to the suspending state by the virtual machine management device according to the instruction of the suspension shift instructing unit to an operating state in which the job execution environment operates when the failure information from the operation device is received by the failure information receiving unit; and a switching unit that switches from the operation device to the virtual machine shifted to the operating state by the virtual machine management device according to the instruction of the operation shift instructing unit to continue execution of the job.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 is a view illustrating a definition file of a VM guest according to the second embodiment;

FIG. 14 is a sequence diagram illustrating the process after the completion of the spare server preparation according to the second embodiment.

DESCRIPTION OF EMBODIMENTS

Preferred embodiments of the present invention will be explained with reference to accompanying drawings. In the following embodiments, an operation management device manages operation of an operation system device (hereinafter, referred to as an "operation device" or an "operation server") and a spare system device (hereinafter, referred to as a "spare device" or a "spare server").

The operation device is a device for executing a job. The spare device is a device for taking over the job executed by the operation device to execute when hardware failure occurs in the operation device. The operation management device switches a "job execution device" for executing the job from the operation device to the spare device to continue the job when the hardware failure occurs in the operation device. The operation management device, the operation device, and the spare device are servers, for example.

The job includes real-time processing executed by the operation device upon request of a terminal device or batch processing executed by the operation device according to predetermined schedule. For example, when taking a financial institution as an example, the job is intended to mean various pieces of processing in an accounting system including an online system in which an automated teller machine (ATM) is the terminal device and an accounting server is the operation device.

Meanwhile, in the following embodiments, a case in which the operation device and the spare device execute the job without processing of data stored in a memory device represented by a storage device is taken as an example. However, it is not a limitation, and the operation device and the spare device may also execute the job with the processing of the data. The following embodiments do not limit disclosed technology.

[a] First Embodiment

Configuration of Operation Management Device According to First Embodiment

Figure 1:
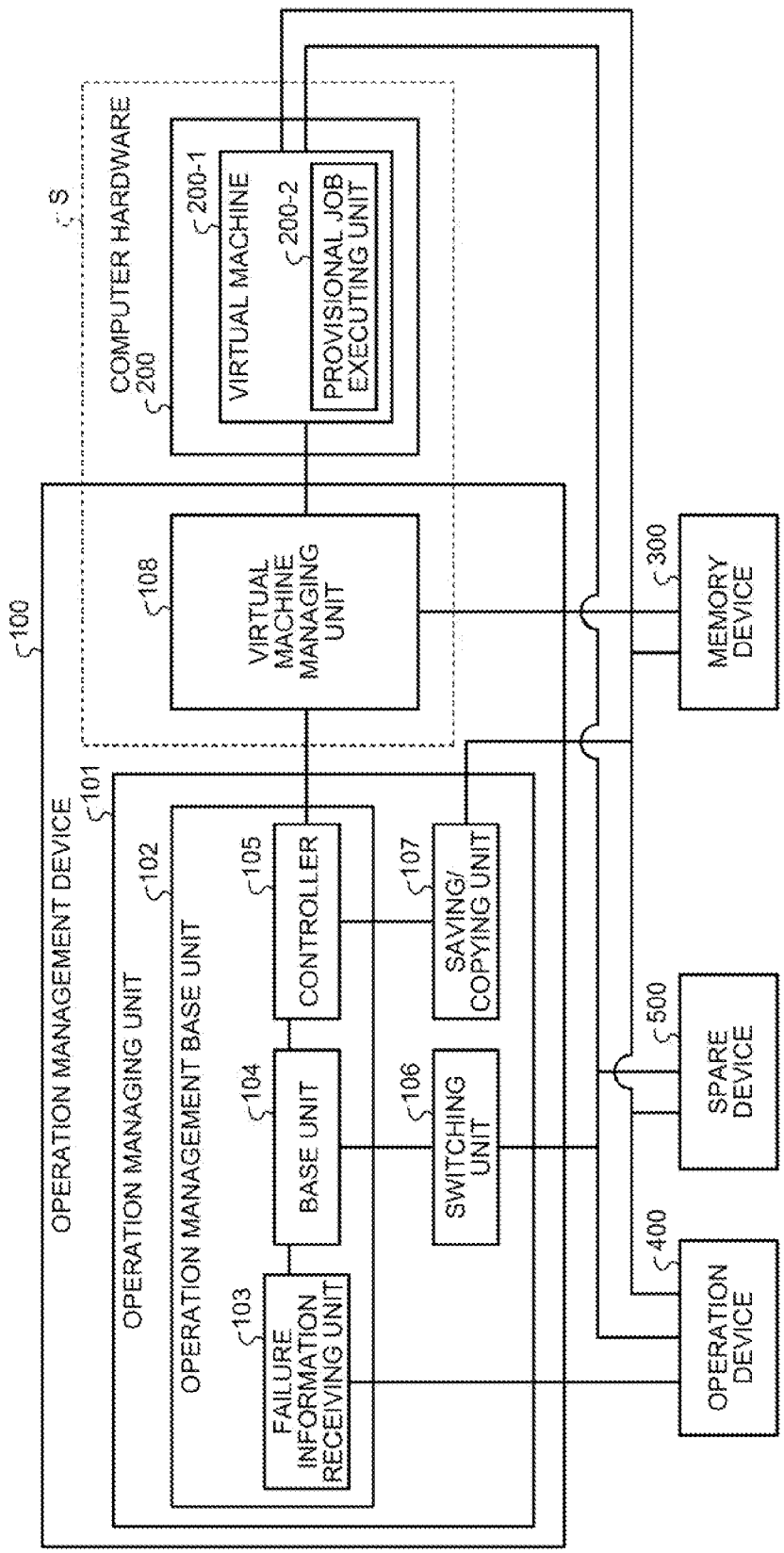
FIG. 1 is a functional block diagram illustrating a configuration of an operation management device according to a first embodiment.

FIG. 1 is a functional block diagram illustrating a configuration of the operation management device according to a first embodiment. As illustrated in FIG. 1, an operation management device 100 according to the first embodiment is connected to computer hardware 200 in which a virtual machine 200-1 may operate.

A memory device 300 being the storage device is connected to the operation management device 100. An operation device 400 for executing the job and a spare device 500 of the operation device 400 are connected to the operation management device 100. The operation management device 100 manages operation of the operation device 400 and the spare device 500.

The memory device 300 is associated with the operation management device 100. The memory device 300 stores a job execution environment including an OS and an application of the job executed in the operation device 400 as a backup image. Meanwhile, the memory device 300 is accessed by a saving/copying unit 107 and a virtual machine managing unit 108 in which a host OS of virtualization software operates to be described later.

Meanwhile, although one operation device 400, one spare device 500 and one virtual machine 200-1 operating on the computer hardware 200 are illustrated in the first embodiment, the number is not limited to this.

The first embodiment merely describes an example of a combination of the spare device 500 associated with the operation device 400 and the virtual machine 200-1. One spare device may be associated with a plurality of operation devices. Meanwhile, one operation device is associated with one virtual machine operating on the computer hardware 200.

The operation management device 100 includes an operation managing unit 101 and the virtual machine managing unit 108. The operation managing unit 101 operates by operation of software referred to as a resource coordinator, for example. The operation managing unit 101 includes an operation management base unit 102, a switching unit 106, and the saving/copying unit 107. The operation management base unit 102 includes a failure information receiving unit 103, a base unit 104, and a controller 105.

Meanwhile, the virtual machine managing unit 108 is a kind of a virtual resource set built on the virtualization software operating in a virtual computer system S referred to as a virtual machine (VM) host.

The virtual resource set includes a virtual central processing unit (CPU), a virtual memory, and a virtual hard disk. The virtual CPU, the virtual memory, and the virtual hard disk are obtained by assigning a CPU as hardware, a memory represented by a random access memory (RAM), and a magnetic recorder represented by a hard disk to one virtual machine by logically dividing them.

The host OS operates on the VM host. The host OS monitors a VM guest, that is to say, the virtual machine 200-1 according to an instruction from the controller 105 of the operation management device 100 and controls the virtual machine 200-1 to start, stop, suspend and restart after suspension. The virtual machine managing unit 108 operates by the operation of the host OS.

On the other hand, relative to the VM host, the VM guest also is a kind of the virtual resource set built on the virtualization software operating in the virtual computer system S. The VM guest is the virtual machine operating under management of the VM host. A provisional job OS operates in the VM guest. When the hardware failure occurs in the operation device 400 associated with the provisional job OS, the provisional job OS temporarily takes over the execution of the job to process a processing request from a user. A provisional job executing unit 200-2 of the virtual machine 200-1 operates by the operation of the provisional job OS.

In the first embodiment, the virtual machine managing unit 108 operates on the operation management device 100, and on the other hand, the virtual machine 200-1 operates on the computer hardware 200 being the hardware different from the operation management device 100. The computer hardware 200 is the same hardware as the spare device 500.

In other words, the virtual computer system S includes the virtual machine managing unit 108 operating on the operation management device 100 and the virtual machine 200-1 operating on the computer hardware 200. However, this is not a limitation, and the virtual machine managing unit 108 may operate on hardware different from the operation management device 100, for example, on the computer hardware 200. Also, the computer hardware 200 may be hardware different from the spare device 500.

The failure information receiving unit 103 of the operation management base unit 102 receives failure information transmitted from a blade server included in the operation device 400 or hardware being a chassis. Then, the failure information receiving unit 103 analyzes the received failure information and specifies a type of failure occurring in the operation device 400 to notify the base unit 104 of this. The failure information is notified as a simple network management protocol (SNMP) trap, for example.

The base unit 104 of the operation management base unit 102 receives various commands input from a graphical user interface (GUI) or a command line interface (CLI) of the terminal device not illustrated of a manager of the operation management device 100. Then, the base unit 104 outputs an instruction to the controller 105 according to a result of analysis of the received various commands.

Specifically, the base unit 104 instructs the controller 105 to associate the spare device 500 with the operation device 400 according to operation of setting of the spare device input from the GUI or the CLI of the terminal device. The controller 105 records correspondence relationship between the operation device 400 and the spare device 500 in a predetermined table.

The base unit 104 instructs the saving/copying unit 107 through the controller 105 to save and copy the backup image of the operation device 400 to the memory device 300. The saving/copying unit 107 saves and copies the backup image of the operation device 400 to the memory device 300 according to the instruction from the controller 105. The controller 105 associates a file name of the backup image with the operation device 400 to record in the predetermined table.

Meanwhile, the controller 105 receives the instruction from the base unit 104 in the operation management base unit 102 to control the saving/copying unit 107 and communicate with the virtual machine managing unit 108. The saving/copying unit 107 operates by operation of image control software, for example. The saving/copying unit 107 receives the instruction from the controller 105 in the operation managing unit 101 to perform the image backup (backup in a sector unit) and restoration of the OS for a device to be managed by the operation management device 100.

The base unit 104 instructs the virtual machine managing unit 108 through the controller 105 to start the virtual machine 200-1 in which the backup image saved and copied to the memory device 300 operates on the computer hardware 200. The virtual machine managing unit 108 starts the virtual machine 200-1 in which the backup image operates on the computer hardware 200 according to the instruction from the controller 105.

Meanwhile, the virtual machine 200-1 includes the provisional job executing unit 200-2 for executing the backup image. Meanwhile, the virtual machine managing unit 108 starts the virtual machine 200-1 on the computer hardware 200, and thereafter shifts the virtual machine 200-1 to a suspending state. When the start and the shift to the suspending state of the virtual machine 200-1 are normally completed, the virtual machine managing unit 108 notifies the controller 105 of normal completion.

The base unit 104 instructs the virtual machine managing unit 108 through the controller 105 to release the suspending state of the virtual machine 200-1 and shift the same to an operating state when it is judged that the hardware failure occurs in the operation device 400 based on the failure information transmitted from the hardware of the operation device 400.

When the virtual machine managing unit 108 receives the instruction through the controller 105 to shift the virtual machine 200-1 to the operating state upon the occurrence of the hardware failure in the operation device 400, this releases the suspending state of the virtual machine 200-1 and shifts the same to the operating state. In this manner, the provisional job executing unit 200-2 for executing the backup image operates in the virtual machine 200-1.

Then, the base unit 104 instructs the switching unit 106 to switch a job execution device from the operation device 400 to the virtual machine 200-1 such that the provisional job executing unit 200-2 takes over the job in the operation device 400 to execute. When the switching unit 106 receives a switching instruction of the job execution device from the base unit 104, this switches the job execution device from the operation device 400 to the virtual machine 200-1.

Then, the base unit 104 instructs the controller 105 to set up the spare device 500. The controller 105, which receives the instruction to set up the spare device 500, instructs the saving/copying unit 107 to copy the backup image of the operation device 400 saved and copied to the memory device 300 to the spare device 500.

When the saving/copying unit 107 receives the instruction to copy the backup image, this copies the backup image of the operation device 400 saved and copied to the memory device 300 to the spare device 500. When copy of the backup image of the operation device 400 to the spare device 500 is completed, the controller 105 starts the application of the job and the OS included in the backup image. When the start of the application of the job and the OS is normally completed in the spare device 500, the controller 105 notifies the base unit 104 of the normal completion.

When the base unit 104 is notified of the normal completion of the start of the application of the job and the OS in the spare device 500, this instructs the switching unit 106 to switch the job execution device from the virtual machine 200-1 to the spare device 500. When the switching unit 106 receives the switching instruction of the job execution device from the base unit 104, this switches the job execution device from the virtual machine 200-1 to the spare device 500.

Then, the base unit 104 instructs the virtual machine managing unit 108 through the controller 105 to stop the virtual machine 200-1. When the virtual machine managing unit 108 receives the instruction to stop the virtual machine 200-1, this stops the operation of the virtual machine 200-1.

The base unit 104 receives a result of execution of the instruction output to the controller 105 by the controller 105 and notifies the GUI or the CLI of the terminal device of the normal termination of the instruction and the occurrence of an error upon execution of the instruction. The base unit 104 executes post-command processing being post-processing of the error occurring upon the execution of the instruction.

Meanwhile, the controller 105 of the operation management base unit 102 controls the saving/copying unit 107 and communicates with the virtual machine managing unit 108 according to the instruction output from the base unit 104 as described above.

Effect of First Embodiment

As described above, in the first embodiment, when the hardware failure occurs in the operation device 400, the provisional job executing unit 200-2 of the virtual machine 200-1 is allowed to temporarily execute the job until the setup of the spare device 500 as an alternative job execution device is completed. The operation of the virtual machine 200-1 is started in a short time by the shift from the suspending state to the operating state. Therefore, it is possible to improve continuity of the job by preventing the execution of the job from being stopped by the hardware failure of the operation device 400 and to improve reliability of a redundant configuration of the job execution device in which the spare device 500 is associated with the operation device 400.

[b] Second Embodiment

Configuration of Operation Management Server According to Second Embodiment

Figure 2:
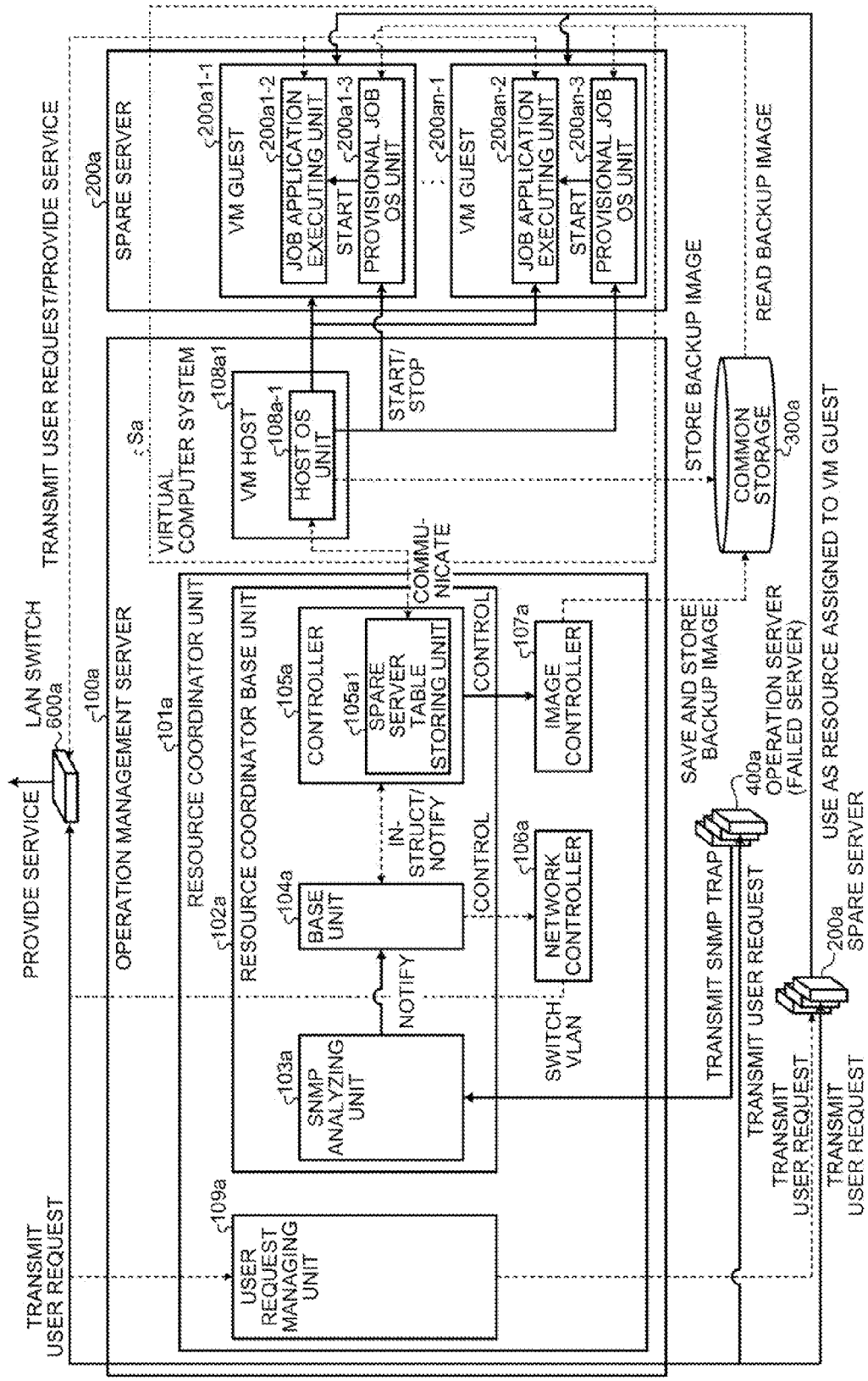
FIG. 2 is a functional block diagram illustrating a configuration of an operation management server according to a second embodiment.

FIG. 2 is a functional block diagram illustrating a configuration of the operation management server according to a second embodiment. As illustrated in FIG. 2, an operation management server 100a according to the second embodiment is connected to a spare server 200a in which VM guests 200a1-1 to 200an-1 (n is a natural number) being the virtual machines may operate.

A common storage 300a is connected to the operation management server 100a via a local area network (LAN). An operation server 400a for executing the job is connected to the operation management server 100a. Meanwhile, the spare server 200a is associated with the operation server 400a as the redundant configuration. In the second embodiment, it is assumed that the operation server 400a is a failed server in which the hardware failure occurs.

The common storage 300a is a memory device associated with the operation management server 100a. The common storage 300a stores the job execution environment including the OS and the application of the job executed in the operation server 400a as the backup image. Meanwhile, the common storage 300a is accessed by an image controller 107a and a host OS unit 108a1 of a VM host 108a operating on the virtualization software to be described later.

Meanwhile, as in the first embodiment, although the operation server 400a, the spare server 200a, and the VM guests 200a1-1 to 200an-1 operating on the spare server 200a correspond one-to-one to each other also in the second embodiment, there is no limitation.

The second embodiment merely describes an example of a combination of the spare server 200a associated with the operation server 400a and the VM guests 200a1-1 to 200an-1. One spare server may be associated with a plurality of operation servers. Meanwhile, one operation server is associated with one VM operating on the spare server.

The operation management server 100a includes a resource coordinator unit 101a, the VM host 108a of a virtual computer system Sa, and a user request managing unit 109a for managing the user request from the terminal device of the user not illustrated.

The resource coordinator unit 101a operates by the operation of the software referred to as the resource coordinator. The resource coordinator unit 101a includes a resource coordinator base unit 102a, a network controller 106a, and the image controller 107a. The resource coordinator base unit 102a includes a SNMP analyzing unit 103a, a base unit 104a, and a controller 105a.

In the second embodiment, the VM host 108a operates on the operation management server 100a, and on the other hand, the VM guests 200a1-1 to 200an-1 operate on the spare server 200a being hardware different from the operation management server 100a. In other words, the virtual computer system Sa includes the VM host 108a operating on the operation management server 100a and the VM guests 200a1-1 to 200an-1 operating on the spare server 200a. The VM guests 200a1-1 to 200an-1 are connected to the operation management server 100a via a virtual local area network (ULAN).

Meanwhile, a LAN switch 600a for transmitting the user request from the terminal device of the user not illustrated to the operation server 400a or the spare server 200a and to the user request managing unit 109a is connected to the operation management server 100a. The LAN switch 600a switches to any one of the operation server 400a, the VM guest associated with the operation server 400a, and the spare server 200a according to the instruction from the network controller 106a to transmit the user request.

The SNMP analyzing unit 103a of the resource coordinator base unit 102a receives the SNMP trap transmitted from the blade server included in the operation server 400a or the hardware being the chassis. Then, the SNMP analyzing unit 103a analyzes the received SNMP trap and specifies the type of an event occurring in the operation server 400a to notify the base unit 104a of the same. In the second embodiment, the type of the event is the hardware failure information.

The base unit 104a of the resource coordinator base unit 102a receives various commands input from the GUI or the CLI of the terminal device not illustrated of a manager of the operation management server 100a. Then, the base unit 104a outputs an instruction to the controller 105a according to a result of analysis of the received various commands.

Specifically, in the second embodiment, the base unit 104a instructs the controller 105a to associate the spare server 200a with the operation server 400a according to the operation of the setting of the spare server input from the GUI or the CLI of the terminal device. The controller 105a records correspondence relationship between the operation server 400a and the spare server 200a in a "spare server table" stored in a spare server table storing unit.

The base unit 104a instructs the image controller 107a through the controller 105a to save and copy the backup image of the operation server 400a to the common storage 300a. The image controller 107a saves and copies the backup image of the operation server 400a to the common storage 300a according to the instruction from the controller 105a. The controller 105a associates the file name of the backup image with the operation device 400 to record in the "spare server table".

Meanwhile, the controller 105a receives the instruction from the base unit 104a in the resource coordinator base unit 102a to control the image controller 107a and communicate with the host OS unit 108a1 of the VM host. The image controller 107a operates by the operation of the image control software. The image controller 107a receives the instruction from the controller 105a in the resource coordinator unit 101a to perform the image backup and the restoration of the OS for the device to be managed by the operation management server 100a. In the second embodiment, the device to be managed by the operation management server 100a is the operation server 400a and the spare server 200a.

The base unit 104a instructs the VM host 108a through the controller 105a to start the VM guest in which the backup image saved and copied to the common storage 300a operates on the spare server 200a. The VM host 108a starts the VM guest in which the backup image operates on the spare server 200a according to the instruction from the controller 105a.

Meanwhile, the VM guests 200a1-1 to 200an-1 include provisional job OS units 200a1-3 to 200an-3 and job application executing units 200a1-2 to 200an-2, respectively, for executing the backup image corresponding to a plurality of operation servers. The "job app" is an abbreviated form of the "job application" and is software for processing the job executed in each operation server. The start of the job application executing units 200a1-2 to 200an-2 is controlled by each of the provisional job OS units 200a1-3 to 200an-3.

Meanwhile, the host OS unit 108a1 of the VM host 108a starts the VM guest 200ai-1 (i is a natural number not larger than n) associated with the operation server 400a on the spare server 200a. The start of the VM guest 200ai-1 is intended to mean the start of the provisional job OS unit 200ai-3 based on the backup image associated with the operation server 400a stored in the common storage 300a.

The provisional job OS unit 200ai-3 starts the job application on the VM guest 200ai-1 based on the backup image associated with the operation server 400a stored in the common storage 300a after the start. The job application executing unit 200ai-2 operates by operation of the job application. Thereafter, the host OS unit 108a1 shifts the VM guest 200ai-1 to the suspending state. At that time, together with the shift of the VM guest 200ai-1 to the suspending state, the job application executing unit 200ai-2 also shifts to the suspending state. When the shift of the VM guest 200ai-1 to the suspending state is normally completed, the host OS unit 108a1 notifies the controller 105a of the normal completion.

The base unit 104a judges whether the hardware failure occurs in the operation server 400a based on an analysis result of the SNMP trap transmitted from the hardware of the operation server 400a by the SNMP analyzing unit 103a. When it is judged that the hardware failure occurs, the base unit 104a instructs the host OS unit 108a1 through the controller 105a to release the suspending state of the VM guest 200ai-1 and shift the same to the operating state.

When the host OS unit 108a1 receives the instruction from the controller 105a to shift the VM guest 200ai-1 to the operating state, this releases the suspending state of the VM guest 200ai-1 and shifts the same to the operating state. In this manner, in the VM guest 200ai-1, the job application executing unit 200ai-2 and the provisional job OS unit 200ai-3 for executing the backup image operate.

Then, the base unit 104a instructs the network controller 106a to switch the job execution device from the operation device 400 to the VM guest 200ai-1 such that the job application executing unit 200ai-2 takes over the job in the operation server 400a to execute. When the network controller 106a receives the switching instruction of the job execution device from the base unit 104a, this switches the job execution device from the operation server 400a to the VM guest 200ai-1.

Then, the base unit 104a instructs the controller 105a to set up the spare server 200a. The controller 105a, which receives the instruction to set up the spare server 200a, instructs the image controller 107a to copy the backup image of the operation server 400a to the spare server 200a.

When the image controller 107a receives the instruction to copy the backup image, this copies the backup image of the operation server 400a to the spare server 200a. When the copy of the backup image of the operation server 400a to the spare server 200a is completed, the controller 105a starts the application of the job and the OS included in the backup image. When the start of the application of the job and the OS is normally completed in the spare server 200a, the controller 105a notifies the base unit 104a of the normal completion.

When the base unit 104a is notified of the normal completion of the start of the application of the job and the OS in the spare server 200a, this instructs the network controller 106a to switch the job execution device from the VM guest 200ai-1 to the spare server 200a. When the network controller 106a receives the switching instruction of the job execution device from the base unit 104a, this switches the job execution device from the VM guest 200ai-1 to the spare server 200a.

Then, the base unit 104a instructs the host OS unit 108a1 of the VM host 108a through the controller 105a to stop the VM guest 200ai-1. When the host OS unit 108a1 receives the instruction to stop the VM guest 200ai-1, this stops the operation of the VM guest 200ai-1.

The base unit 104a receives a result of execution of the instruction output to the controller 105a by the controller 105a and notifies the GUI or the CLI of the terminal device of the normal termination of the instruction and the occurrence of the error upon the execution of the instruction. The base unit 104a executes the post-command processing being the post-processing of the error occurring upon the execution of the instruction. Meanwhile, the controller 105a of the resource coordinator base unit 102a controls the image controller 107a and communicates with the VM host 108a according to the instruction output from the base unit 104a as described above.

The user request managing unit 109a temporarily stocks the user request when switching the job execution device from the VM guest 200ai-1 to the spare server 200a in the resource coordinator unit 101a. In other words, the user request is stocked from start to completion of the switching of the job execution device from the VM guest 200ai-1 to the spare server 200a.

When the switching of the job execution device to the spare server 200a is completed, the stocked user request is transmitted to the spare server 200a. In this manner, by the user request managing unit 109a, processing contradiction of the user request, for example, wrong order of the processing and omission of the process of the processing request, which might occur when switching the job execution device from the VM guest 200ai-1 to the spare server 200a, may be prevented.

Spare Server Table

Figures 3, 4:
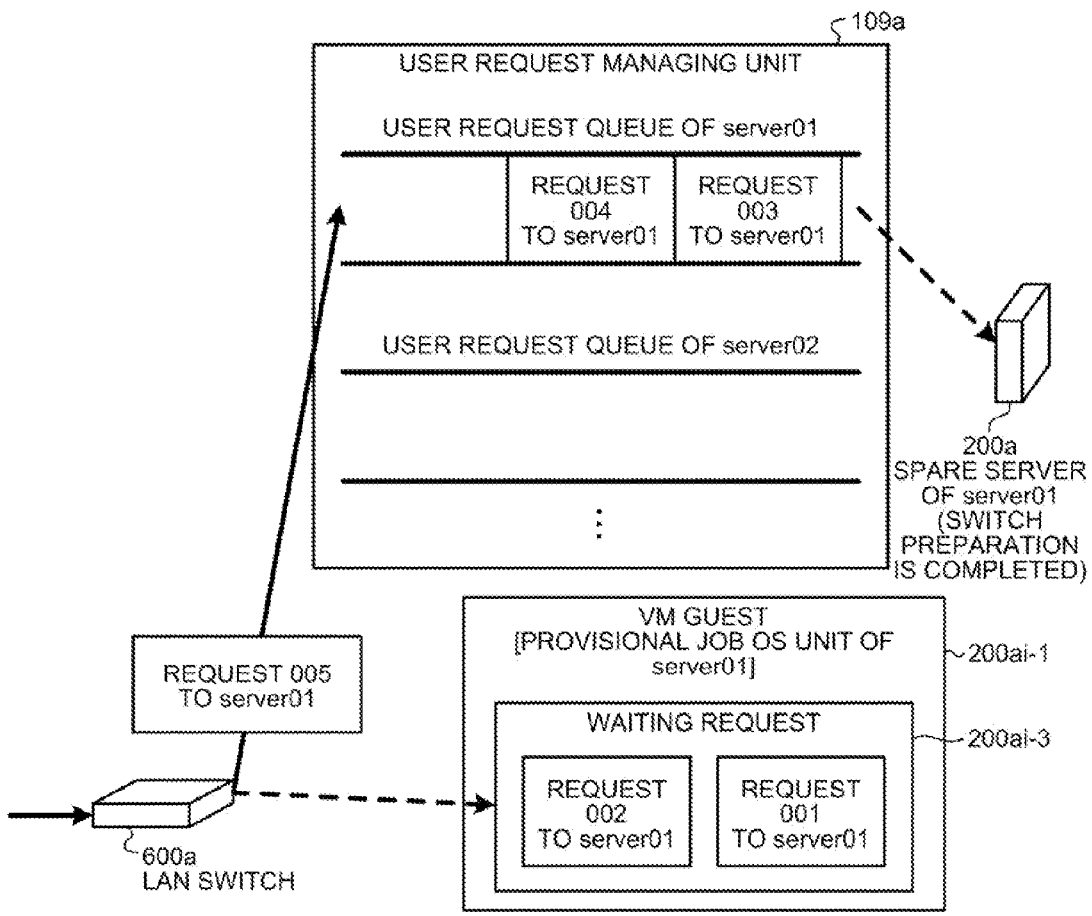
FIG. 3 is a view illustrating a spare table server according to the second embodiment.
FIG. 4 is a view illustrating an outline of a management method of a user request in a user request managing unit according to the second embodiment.

FIG. 3 is a view illustrating the spare server table according to the second embodiment. The spare server table is generated when the resource coordinator is installed into the operation management server 100a and is stored in the spare server table storing unit 105a1. A record is added at timing when the manager of the operation management server 100a performs spare server setting operation to associate the spare server 200a with the operation server 400a.

The spare server table includes items such as a spare server name, an original server name before switching, a backup image name and a provisional operation flag. The original server name before switching is information to identify the operation server, which executes the job. The spare server name is a name to identify the spare server associated with the operation server.

The backup image name is a file name to identify the backup image saved and copied from the operation server 400a to the common storage 300a when the spare server setting operation is performed by the manager of the operation management server 100a. The provisional operation flag is a flag set to "TRUE" when the start of the VM guest 200ai-1 is successful based on the backup image and the provisional job OS unit 200ai-3 is able to be shifted to the suspending state. It is possible to judge whether the provisional job OS unit 200ai-3 is in the suspending state by the provisional operation flag.

As illustrated in FIG. 3, for example, it is understood that the name of the operation server corresponding to the spare server of which spare server name is "spare_server01" is "server01", the backup image of the "server01" is "backup_imageA", and the provisional operation flag is "TRUE".

Outline of Management Method of User Request in User Request Managing Unit

FIG. 4 is a view illustrating an outline of a management method of the user request in the user request managing unit according to the second embodiment. As illustrated in the drawing, assume that request 001, request 002, request 003, request 004, and request 005 sequentially arrive at the LAN switch 600a as the user requests to the operation server 400a (server01) after the occurrence of the hardware failure in the operation server 400a.

When the hardware failure occurs in the operation server 400a, the VM guest 200ai-1 operates as the job execution device, so that the user request is transmitted to the VM guest 200ai-1. In FIG. 4, the request 001 and the request 002 are transmitted to the provisional job OS unit 200ai-3 of the VM guest 200ai-1. The provisional job OS unit 200ai-3 manages the request 001 and the request 002 as waiting requests and allows the job application executing unit 200ai-2 to sequentially execute the processing.

When the setup of the spare server 200a of the operation server 400a is started, the LAN switch 600a stops transmitting the user request to the VM guest 200ai-1. Afterward, the LAN switch 600a transmits the request 003, the request 004, and the request 005 to the user request managing unit 109a.

Meanwhile, the user request managing unit 109a manages the user request for each operation server. Then, the user request managing unit 109a suspends request transmission to the spare server 200a until the processing of the request 001 and the request 002 in the job application executing unit 200ai-2 is completed. In this manner, the processing contradiction of the user request, for example, the wrong order of the processing and the omission of the process of the processing request, which might occur when switching the job execution device from the VM guest 200ai-1 to the spare server 200a, may be prevented.

Definition File of VM Guest

FIG. 5 is a view illustrating a definition file of the VM guest according to the second embodiment. The definition file of the VM guest is managed by the host OS unit 108a1 of the VM host 108a for each VM guest. As illustrated in FIG. 5, the definition file of the VM host includes items such as "name" indicating a VM guest name, "maxmem" indicating a maximum amount of a memory assigned to the VM guest, and "memory" indicating an amount of the memory assigned to the VM guest.

The definition file of the VM guest includes an item "disk" indicating the file name of the backup image of the OS and the job application executed in the VM guest. Meanwhile, although not illustrated, the definition file of the VM guest may include the item to define an assigned amount of the CPU, a magnetic disk device and another computer hardware resource in addition to the items "maxmem" and "memory".

As illustrated in FIG. 5, according to the definition file of the VM guest, it is defined that the VM guest of which "name" is "rhel53" is created based on the backup image of which "disk" is "backup_imageA", for example. Also, the "maxmem" and the "memory" of the VM guest "rhel53" created based on the backup image of which "disk" is "backup_imageA" are 1024 Mbytes and 1024 Mbytes, respectively.

Meanwhile, as is to be described later, when the setup and the start of the spare server 200a are not normally completed, the VM guest continuously processes the job as the job execution device. In this case, in consideration of processing load of the VM guest, the assigned amount of the computer hardware resource including the "maxmem" and the "memory" is increased. In this case, a set value of the relevant item of the definition file of the VM guest is rewritten. In this manner, it is possible to improve processing performance of the VM guest, thereby preventing the trouble in the execution of the job from occurring when the VM guest continues executing the job as the job execution device.

Outline of Process according to Second Embodiment

Figure 6:
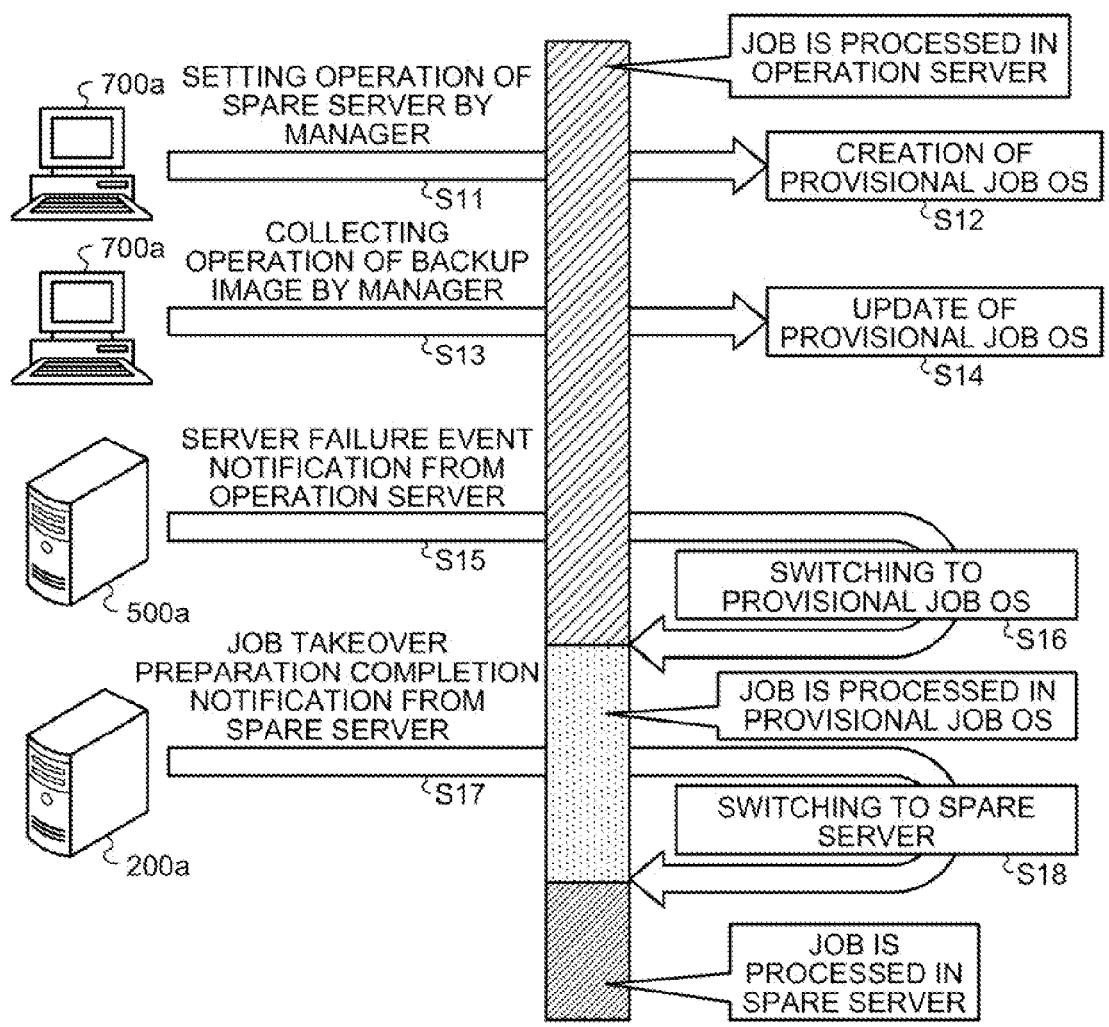
FIG. 6 is a view illustrating an outline of a process according to the second embodiment.

FIG. 6 is a view illustrating an outline of the process according to the second embodiment. As illustrated in FIG. 6, the operation management server 100a first accepts the setting operation of the spare server input to a terminal device 700a by the manager (step S11). Subsequently, the operation management server 100a copies the backup image of the provisional job OS to the common storage 300a (step S12).

Subsequently, the operation management server 100a accepts update operation of the backup image input to the terminal device 700a by the manager (step S13). Subsequently, the operation management server 100a updates the backup image of the common storage 300a by a newest backup image of the operation server 400a (step S14).

Subsequently, the operation management server 100a accepts notification of the event of server failure from the operation server 400a (step S15). Subsequently, the operation management server 100a switches an executing subject of the job to the provisional job OS based on the newest backup image updated at step S14 (step S16). At that time, the job executing subject is switched from the operation server 400a to the provisional job OS.

Subsequently, the operation management server 100a accepts preparation completion notification of the takeover of the job of the spare server 200a (step S17). Subsequently, the operation management server 100a switches the job executing subject from the provisional job OS to the spare server 200a (step S18). After that time point, the job executing subject is switched from the provisional job OS to the spare server 200a.

Procedure of Provisional Job Preparation Process According to Second Embodiment

Figure 7:
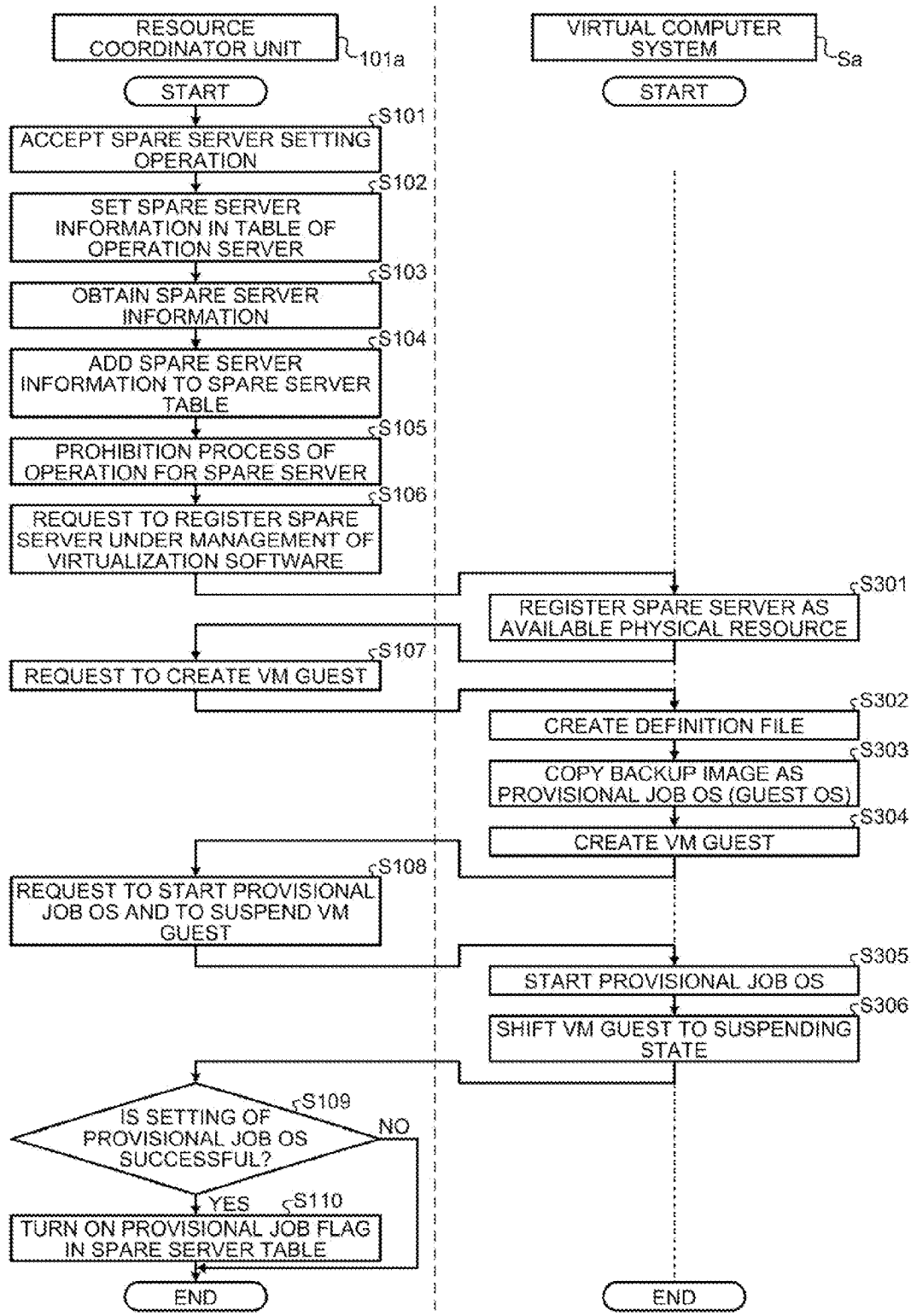
FIG. 7 is a flowchart illustrating a procedure of a provisional job preparation process according to the second embodiment.

FIG. 7 is a flowchart illustrating a procedure of a provisional job preparation process according to the second embodiment. The provisional job preparation process is a process to create the VM guest, which takes over the job of the operation server 400a under the management of the virtualization software, in advance and start the same to set to the suspending state in which the job may be immediately taken over from the operation server.

Assumption of execution of the procedure of the provisional job preparation process is as follows. When the manager inputs the setting operation of the spare server from the GUI or the CLI of the terminal device, this selects to perform the provisional operation of the job by the guest when the hardware failure occurs in the operation server 400a. The virtualization software is installed in advance into the operation management server 100a and the host OS of the VM host, which may communicate with the resource coordinator unit 101a, operates.

The backup image requested for starting the provisional job OS is already obtained from the operation server 400a. Also, a sufficient resource is available for starting the provisional job OS under the virtualization software. Also, under the virtualization software, the resource assigned to the VM guest in the suspending state may be freely reassigned to another VM guest.

As illustrated in FIG. 7, in the resource coordinator unit 101a, the base unit 104a of the resource coordinator unit 101a first accepts the spare server setting operation from the manager (step S101). Subsequently, the controller 105a sets the operation server name, the spare server name associated with the operation server and the file name of the corresponding backup image in the operation server table (not illustrated) managed in the controller 105a (step S102). Meanwhile, the operation server name, the spare server name associated with the operation server, and the file name of the corresponding backup image are referred to as spare server information.

Subsequently, the controller 105a obtains the spare server information from the operation server table (step S103). Subsequently, the controller 105a adds the spare server information obtained at step S103 to the spare server table (step S104).

Subsequently, the base unit 104a performs a prohibition process of the operation to the spare server 200a corresponding to the spare server information added to the spare server table at step S103 (step S105). Herein, the operation to the spare server is intended to mean various operations performed by the resource coordinator unit 101a for the spare server. Subsequently, the controller 105a requests the virtual computer system Sa to register the spare server 200a under the management of the virtualization software (step S106).

Subsequently, the host OS unit 108a1, which receives the registration request of the spare server 200a under the management of the virtualization software from the controller 105a, registers the spare server 200a as a physical resource available in the virtual computer system Sa (step S301). In other words, a managing subject of the spare server 200a is changed from the resource coordinator unit 101a to the host OS unit 108a1. This is because it is required that one hardware be managed by one managing subject in a unified manner.

Subsequently, the controller 105a of the resource coordinator unit 101a requires the host OS unit 108a1 of the VM host 108a to create the VM guest (step S107). Subsequently, the host OS unit 108a1 of the virtual computer system Sa, which receives the request to create the VM guest, creates the definition file of the VM host required for starting the VM host (step S302).

Subsequently, the host OS unit 108a1 copies the backup image of the operation server 400a stored in the common storage 300a to the spare server 200a as the provisional job OS (guest OS) (step S303). Subsequently, the host OS unit 108a1 creates the VM guest based on the definition file of the VM guest created at step S302 and the backup image copied at step S303 (step S304).

Subsequently, the controller 105a of the resource coordinator unit 101a requires the host OS unit 108a1 of the VM host 108a to start the provisional job OS and to suspend the VM guest (step S108).

Subsequently, the host OS unit 108a1 of the VM host 108a, which receives the request to start the provisional job OS and to suspend the VM guest, starts the provisional job OS (step S305). Subsequently, the host OS unit 108a1 shifts the VM guest in which the provisional job OS is started to the suspending state (step S306). The host OS unit 108a1 notifies the controller 105a of the resource coordinator unit 101a of a processing result at step S306. Meanwhile, the processes at steps S305 and S306 are referred to as setting of the provisional job OS.

Subsequently, the controller 105a of the resource coordinator unit 101a judges whether the setting of the provisional job OS is successful based on the processing result at step S306 from the host OS unit 108a1 (step S109). When it is judged that the setting of the provisional job OS is successful (step S109: YES), the procedure shifts to step S110, and when it is not judged that the setting of the provisional job OS is successful (step S109: NO), the provisional job preparation process is terminated.

At step S110, the controller 105a turns on (sets to true) the provisional operation flag of the spare server 200a in the spare server table. When the process at step 5110 is terminated, the provisional job preparation process is terminated.

Sequence Diagram Illustrating Provisional Job Preparation Process

Figure 8:
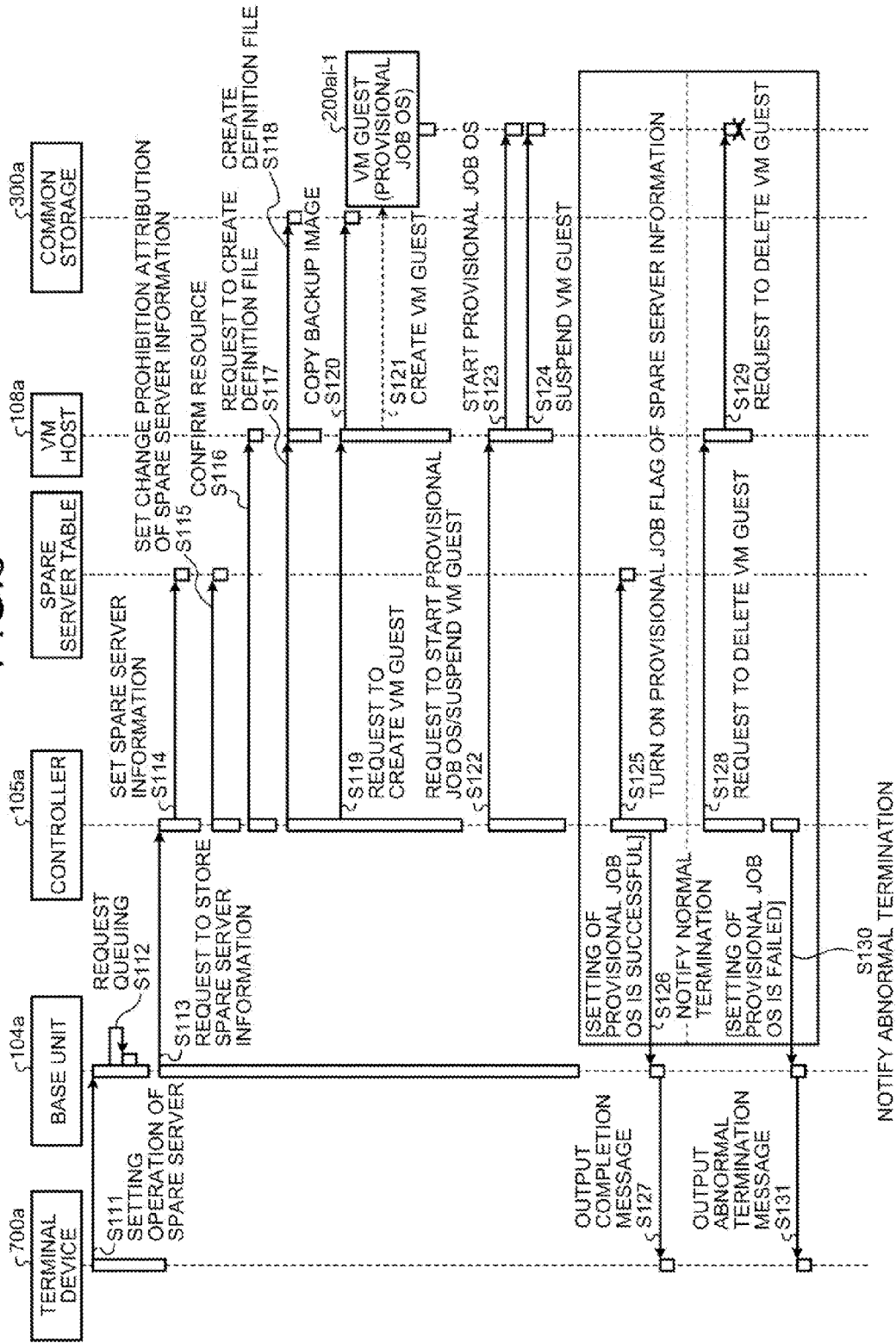
FIG. 8 is a sequence diagram illustrating the provisional job preparation process according to the second embodiment.

FIG. 8 is a sequence diagram illustrating the provisional job preparation process according to the second embodiment. As illustrated in the drawing, the request of the setting operation of the spare server input to the terminal device 700a of the manager of the operation management server 100a is first transmitted to the base unit 104a of the resource coordinator unit 101a (step S111).

Subsequently, the base unit 104a receives the request of the setting operation of the spare server received from the terminal device 700a and registers the same in a queue (request queuing) (step S112). Subsequently, the base unit 104a outputs a storing request of the spare server information to the controller 105a (step S113).

Subsequently, the controller 105a sets the spare server information in the spare server table according to the storing request of the spare server information input from the base unit 104a (step S114). Subsequently, the controller 105a sets attribution of change prohibition of the spare server information in the spare server table (step S115). After step S115, the spare server information set in the spare server table at step S114 cannot be changed.

Subsequently, the controller 105a confirms with the VM host 108a whether the resource to create the VM guest in the spare server 200a is sufficient (step S116). Subsequently, the controller 105a requires the VM host 108a to create the definition file of the VM guest (step S117). Subsequently, the VM host 108a, which receives the request to create the definition file of the VM guest from the controller 105a, creates the definition file and stores the same in the common storage 300a (step S118).

Subsequently, the controller 105a requires the VM host 108a to create the VM guest (step S119). Subsequently, the VM host 108a, which receives the request to create the VM guest from the controller 105a, stores the backup image of the operation server 400a in the common storage 300a (step S120).

Subsequently, the VM host 108a creates the VM guest 200ai-1 (i is a natural number not larger than n), i.e., the provisional job OS on the spare server 200a (step S121). Subsequently, the controller 105a of the resource coordinator unit 101a requires the VM host 108a to start the provisional job OS created on the spare server 200a and to suspend the started provisional job OS (step S122).

Subsequently, the VM host 108a, which receives the request to start the provisional job OS created on the spare server 200a and to suspend the started provisional job OS, starts the provisional job OS (step S123). Subsequently, the VM host 108a shifts the started provisional job OS to the suspending state (step S124).

Subsequently, when the process at step S124 is normally terminated, the controller 105a of the resource coordinator unit 101a turns on the provisional flag corresponding to the relevant spare server information in the spare server table (step S125). Then, the controller 105a notifies the base unit 104a of the normal termination of the process at step S124, that is to say, notifies the base unit 104a the normal termination of the setting of the provisional job OS (step S126). Then, the base unit 104a outputs a completion message to notify the normal termination of the setting of the provisional job OS to the terminal device 700a (step S127).

On the other hand, when the process at step S124 is abnormally terminated, the controller 105a of the resource coordinator unit 101a requires the VM host 108a to delete the VM guest 200ai-1 created at step S121 (step S128). Then, the VM host 108a deletes the VM guest 200ai-1 (step S129).

Subsequently, the controller 105a notifies the base unit 104a of the abnormal termination of the process at step S124, that is to say, the abnormal termination of the setting of the provisional job OS (step S130). Then, the base unit 104a outputs an abnormal termination message to notify the abnormal termination of the setting of the provisional job OS to the terminal device 700a (step S131).

When the process at step S124 is normally terminated, the spare server 200a in which the provisional job OS operates is prepared as the job execution device capable of immediately taking over the execution of the job upon the occurrence of the failure of the operation server 400a.

Figure 9:
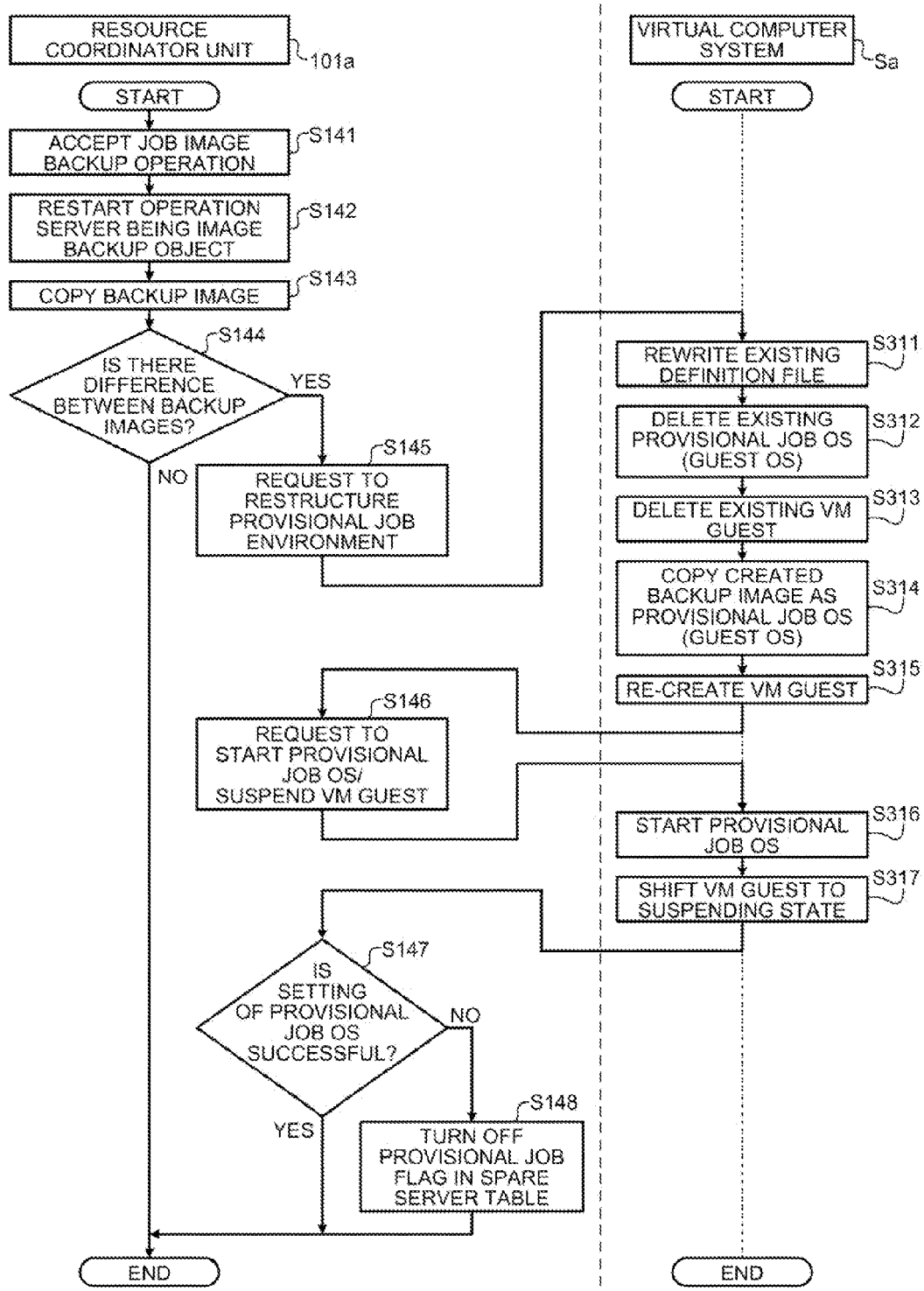
FIG. 9 is a flowchart illustrating a procedure of a provisional job environment update process according to the second embodiment.

Procedure of Provisional Job Environment Update Process According to Second Embodiment FIG. 9 is a flowchart illustrating a procedure of a provisional job environment update process according to the second embodiment. The provisional job environment update process is a process to reflect change in the job execution environment by software update represented by patch application to the OS and the job application of the operation server 400a to the backup image. Meanwhile, addition and deletion of the hardware resource of the operation server 400a, the spare server 200a, and the operation management server 100a are not objects of the provisional job environment update process. Assumption of execution of the provisional job environment update process is identical to that of the provisional job preparation process illustrated in FIG. 7.

As illustrated in FIG. 9, in the resource coordinator unit 101a, the base unit 104a of the resource coordinator unit 101a first accepts an image backup operation of the job execution environment of the operation server 400a input by the manager to the terminal device 700a (step S141).

Subsequently, the image controller 107a restarts the operation server 400a, which is the object of the image backup (step S142). Subsequently, the image controller 107a copies the backup image of the operation server 400a to the common storage 300a (step S143).

Subsequently, the controller 105a judges whether there is difference between the backup image copied to the common storage 300a in the process at step S143 and the backup image copied to the common storage 300a by the previous process (step S144). When it is judged that there is the difference between the backup images copied to the common storage 300a (step S144: YES), the procedure shifts to step S145, and when it is not judged that there is the difference (step S144: NO), the provisional job environment update process is terminated.

At step S145, the controller 105a requires the host OS unit 108a1 of the VM host 108a of the virtual computer system Sa to restructure the provisional job environment, that is to say, the VM guest 200ai-1 including the guest OS and the job application.

The host OS unit 108a1 of the virtual computer system Sa, which receives the request to restructure the provisional job environment from the controller 105a of the resource coordinator unit 101a, rewrites the existing definition file of the VM guest of the VM guest 200ai-1 (step S311).

Subsequently, the host OS unit 108a1 deletes the existing provisional job OS (guest OS) of the VM guest 200ai-1 (step S312). Then, the host OS unit 108a1 deletes the existing VM guest 200ai-1 (step S313). Then, the host OS unit 108a1 copies the backup image created at step S143 to the common storage 300a as the provisional job OS (guest OS) (step S314). Then, the host OS unit 108a1 re-creates the VM guest 200ai-1 based on the backup image created at step S143 (step S315).

When the VM guest 200ai-1 is re-created at step S315, the controller 105a of the resource coordinator unit 101a requires the host OS unit 108a1 to start the provisional job OS and to shift the VM guest to the suspending state (step S146).

The host OS unit 108a1, which receives the request to start the provisional job OS and to shift the VM guest to the suspending state from the controller 105a, starts the provisional job OS copied to the spare server 200a at step S314 (step S316). Then, the host OS unit 108a1 shifts the VM guest 200ai-1 re-created at step S315 to the suspending state (step S317).

Following the process at step S317, the controller 105a judges whether the setting of the provisional job OS, that is to say, the start of the provisional job OS and the shift of the VM guest 200ai-1 to the suspending state are successful in the spare server 200a (step S147). When it is judged that the setting of the provisional job OS is successful (step S147; yes), the provisional job environment update process is terminated, and when it is not judged that the setting of the provisional job OS is successful (step S147: NO), the procedure shifts to step S148. At step S148, the controller 105a turns off the provisional operation flag corresponding to the spare server 200a in the spare server table.

Meanwhile, the provisional job environment update process is performed upon acceptance of the image backup operation of the job execution environment of the operation server 400a input by the manager to the terminal device 700a. However, the process is not limited to this and may be performed according to job schedule set in the operation management server 100a. In a case of a configuration in which the software update of the operation server 400a is automatically performed, the provisional job environment update process may be automatically performed after the software update.

Figure 10:
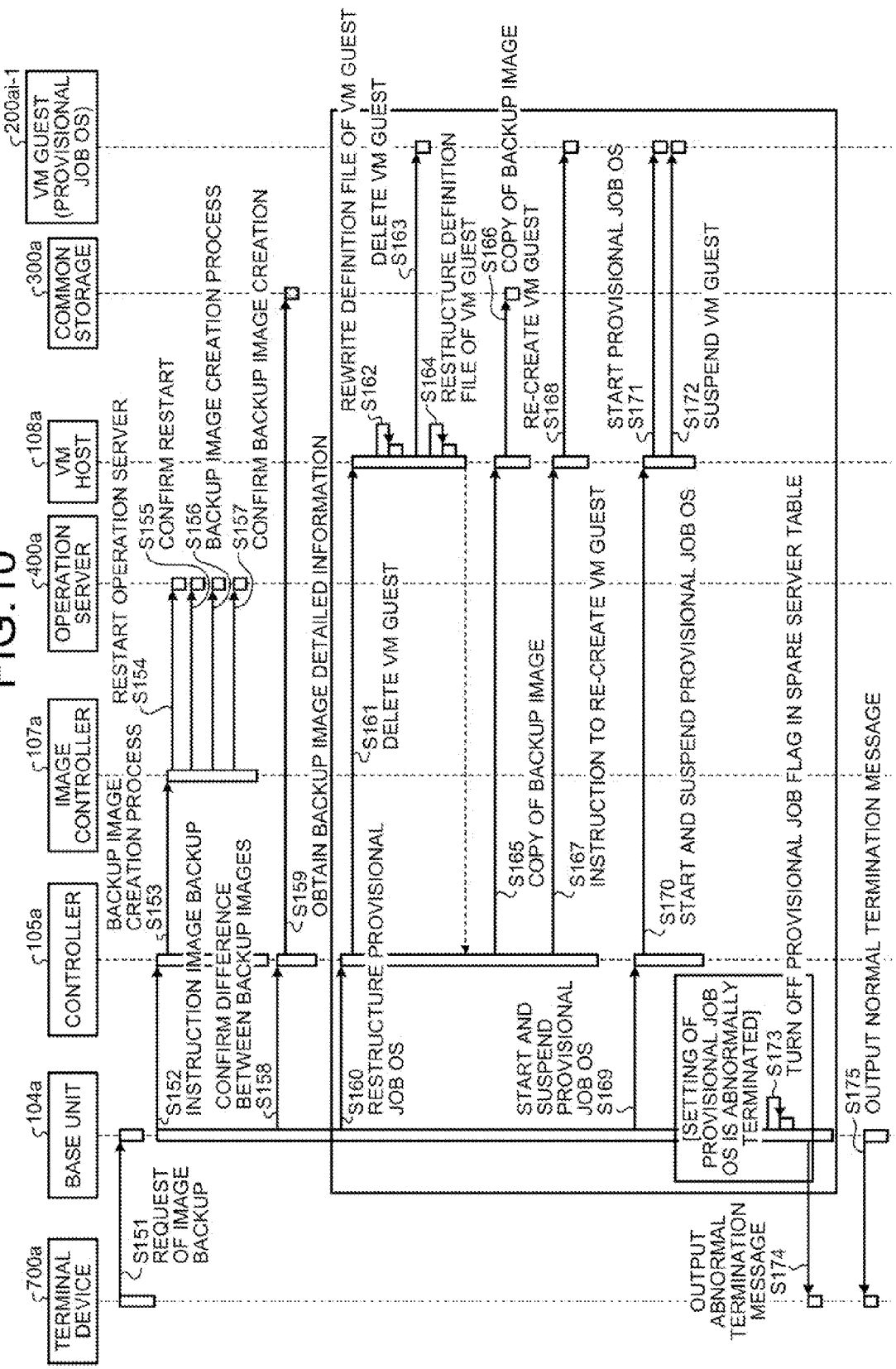
FIG. 10 is a sequence diagram illustrating the provisional job environment update process according to the second embodiment.

Sequence Diagram Illustrating Provisional Job Environment Update Process According to Second Embodiment FIG. 10 is a sequence diagram illustrating the provisional job environment update process according to the second embodiment. As illustrated in the drawing, the request of the image backup of the operation server 400a input to the terminal device 700a of the manager of the operation management server 100a is first transmitted to the base unit 104a of the resource coordinator unit 101a (step S151).

Subsequently, the base unit 104a outputs an instruction of the image backup of the operation server 400a to the controller 105a (step S152). Subsequently, the controller 105a instructs the image controller 107a to create the backup image according to the instruction of the image backup input from the base unit 104a (step S153).

Subsequently, the image controller 107a restarts the operation server 400a (step S154). Then, the image controller 107a confirms the restart of the operation server 400a (step S155). Then, the image controller 107a performs a creation process of the backup image of the operation server 400a (step S156). Then, the image controller 107a confirms the backup image created from the operation server 400a (step S157).

Subsequently, the base unit 104 instructs the controller 105a to confirm difference between the backup image created at step S156 and the existing backup image (step S158). Subsequently, the controller 105a judges difference between the backup image created at step S156 and detailed information of the existing backup image stored in the common storage 300a (step S159).

Subsequently, when it is judged that there is the difference between the backup image created at step S156 and the existing backup image by the controller 105a, the base unit 104a instructs the controller 105 to restructure the provisional job OS (step S160). Subsequently, the controller 105a, which receives the instruction to restructure the provisional job OS, instructs the VM host 108a to delete the VM guest 200ai-1 (step S161).

Subsequently, the VM host 108a, which receives the instruction to delete the VM guest 200ai-1, rewrites the definition file of the VM guest 200ai-1 (step S162). Then, the VM host 108a deletes the VM guest 200ai-1 (step S163). Then, the VM host 108a restructures the definition file of the VM guest 200ai-1 (step S164). Meanwhile, when the process at step S164 is terminated, the VM host 108a transmits completion notification to the controller 105a.

Subsequently, the controller 105a instructs the VM host 108a to copy the backup image created at step S156 to the common storage 300a (step S165). Subsequently, the VM host 108a copies the backup image created at step S156 to the common storage 300a (step S166).

Subsequently, the controller 105a instructs the VM host 108a to re-create the VM guest 200ai-1 based on the backup image copied to the common storage 300a at step S166 (step S167). Subsequently, the VM host 108a re-creates the VM guest 200ai-1 (step S168).

Subsequently, the base unit 104a instructs the controller 105a to start the provisional job OS and to suspend the VM guest 200ai-1 (step S169). Subsequently, the controller 105a instructs the VM host 108a to start the provisional job OS and to suspend the VM guest 200ai-1 (step S170).

Subsequently, the VM host 108a starts the provisional job OS on the VM guest 200ai-1 (step S171). Then, the VM host 108a shifts the VM guest 200ai-1 to the suspending state (step S172).

Meanwhile, when the start of the provisional job OS or the shift of the VM guest 200ai-1 to the suspending state, that is to say, the setting of the provisional job OS is abnormally terminated, the base unit 104a turns off the corresponding provisional operation flag in the spare server table (step S173). Then, the base unit 104a outputs the message of the abnormal termination to the terminal device 700a (step S174). On the other hand, when the setting of the provisional job OS is normally terminated, the base unit 104a outputs the message of the normal termination to the terminal device 700a (step S175).

Procedure of Provisional Job Start Process According to Second Embodiment

Figure 11:
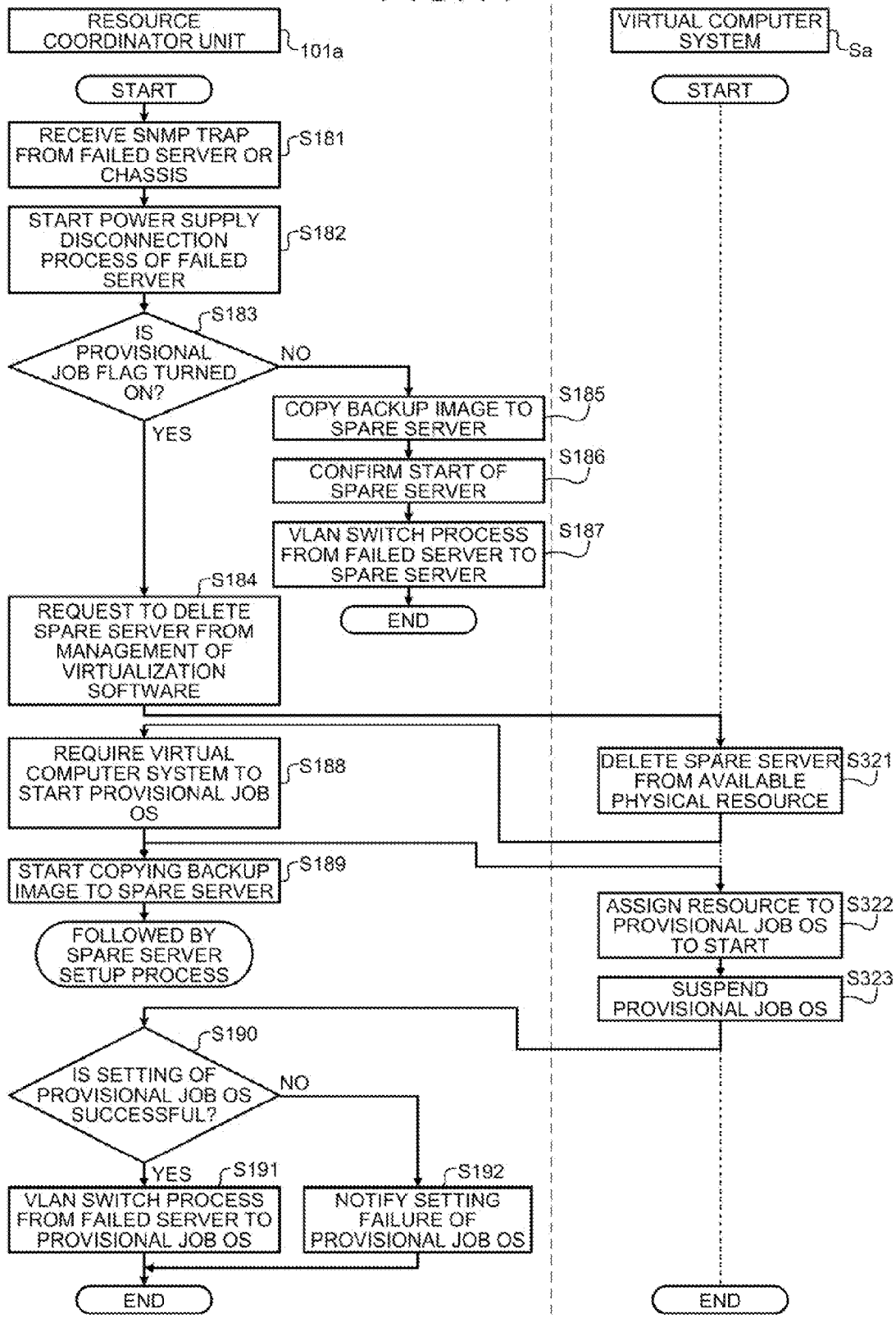
FIG. 11 is a flowchart illustrating a procedure of a provisional job start process according to the second embodiment.

FIG. 11 is a flowchart illustrating a procedure of a provisional job start process according to the second embodiment. The provisional job start process is a process in which the VM guest operating under the management of the virtualization software takes over the job of the operation server 400a.

Assumption of execution of the provisional job start process is identical to that of the provisional job preparation process illustrated in FIG. 7. As illustrated in FIG. 7, in the resource coordinator unit 101a, the SNMP analyzing unit 103a of the resource coordinator unit 101a first receives the SNMP trap from the failed operation server 400a or the chassis of the operation server 400a (step S181).

Subsequently, the SNMP analyzing unit 103a starts a power source disconnection process of the failed operation server 400a (step S182). Subsequently, the controller 105a refers to the spare server table to judge whether the provisional operation flag corresponding to the operation server 400a is turned on (step S183). When it is judged that the provisional operation flag is turned on (step S183: YES), the procedure shifts to step S184, and when it is not judged that the provisional operation flag is turned on (step S183: NO), the procedure shifts to step S185.

At step S184, the controller 105a instructs the host OS unit 108a1 of the VM host 108a of the virtual computer system Sa to delete the registration of the spare server 200a from the management of the virtualization software. Then, the host OS unit 108a1 deletes the spare server 200a from the available physical resource (step S321). In other words, in the process at step S321, the managing subject of the spare server 200a is changed from the virtual computer system Sa to the operation management server 100a.

On the other hand, at step S185, the image controller 107a copies the backup image of the operation server 400a to the spare server 200a. Then, the controller 105a confirms the start of the spare server 200a (step S186). Then, the controller 105a instructs the network controller 106a to switch the VLAN from the operation server 400a being the failed server to the spare server 200a (step S187). The network controller 106a controls the LAN switch 600a to switch the VLAN from the operation server 400a to the spare server 200a.

In the virtual computer system Sa, when the process at step S321 is terminated, the controller 105a of the resource coordinator unit 101a requires the VM host 108a of the virtual computer system Sa to start the provisional job OS (step S188). Then, the controller 105a controls the image controller 107a to start copying the backup image to the spare server 200a (step S189).

The VM host 108a first assigns the hardware resource to the provisional job OS to start according to the request from the controller 105a to start the provisional job OS (step S322). Meanwhile, the provisional job OS unit 200ai-3 and the job application executing unit 200ai-2 (i is a natural number not larger than n) operate by the operation of the provisional job OS. Then, the VM host 108a shifts the provisional job OS to the suspending state (step S323). Meanwhile, the start of the provisional job OS and the shift of the provisional job OS to the suspending state are referred to as the setting of the provisional job OS.

Subsequently, the controller 105a of the resource coordinator unit 101a judges whether the setting of the provisional job OS is successful in the virtual computer system Sa (step S190). When it is judged that the setting of the provisional job OS is successful (step S190: YES), the procedure shifts to step S191, and when it is not judged that the setting of the provisional job OS is successful (step S190: NO), the procedure shifts to step S192.

At step S191, the controller 105a instructs the network controller 106a to switch the VLAN from the operation server 400a being the failed server to the VM guest 200ai-1 in which the job application executing unit 200ai-2 operates. The network controller 106a controls the LAN switch 600a to switch the VLAN from the operation server 400a to the VM guest 200ai-1.

On the other hand, at step S192, the terminal device 700a is notified of failure of the setting of the provisional job OS. Then, the terminal device 700a outputs notification of the failure of the setting of the provisional job OS. When the process at step S191 or step S192 is terminated, the provisional job start process is terminated.

Figure 12:
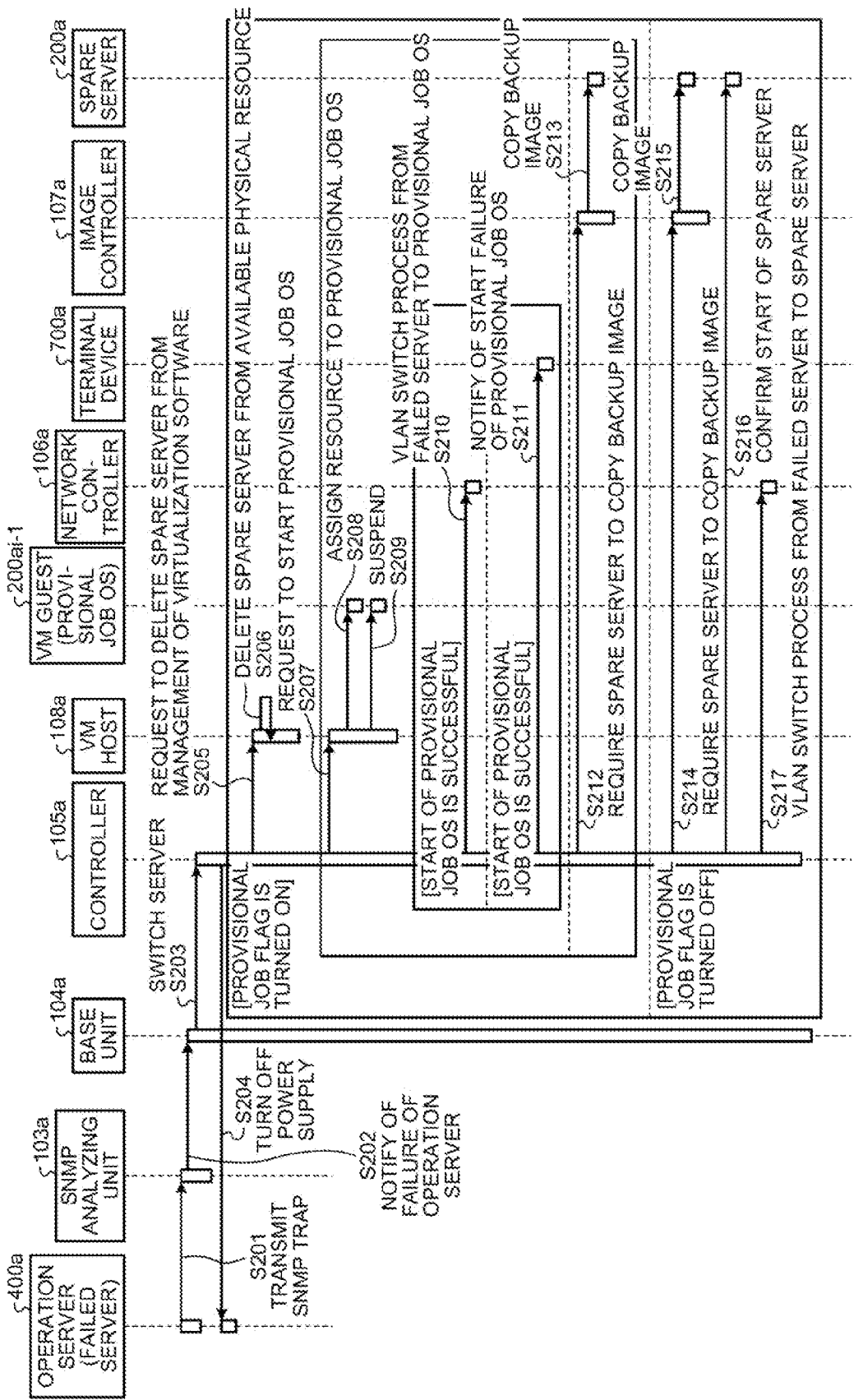
FIG. 12 is a sequence diagram illustrating the provisional job start process according to the second embodiment.

Sequence Diagram Illustrating Provisional Job Start Process According to Second Embodiment FIG. 12 is a sequence diagram illustrating the provisional job start process according to the second embodiment. As illustrated in the drawing, the operation server 400a being the failed server first transmits the SNMP trap to the SNMP analyzing unit 103a of the resource coordinator unit 101a (step S201). Subsequently, when the SNMP analyzing unit 103a receives the SNMP trap, this notifies the base unit 104a of the failure of the operation server 400a (step S202).

Subsequently, when the base unit 104a is notified of the failure of the operation server 400a, this instructs the controller 105a to switch the server being the job execution device (step S203). Subsequently, the controller 105a turns off the power supply of the operation server 400a (step S204).

Subsequently, the controller 105a instructs the VM host 108a to delete the spare server 200a from the management of the virtualization software when the provisional operation flag corresponding to the operation server 400a is turned on in the spare server table (step S205). The VM host 108a deletes the spare server 200a from the management of the virtualization software according to the instruction (step S206).

Subsequently, the controller 105a requires the VM host 108a to start the provisional job OS (step S207). Subsequently, the VM host 108a assigns the hardware resource to the VM guest 200ai-1 (step S208). Subsequently, the VM host 108a shifts the provisional job OS started at step S208 to the suspending state (step S209).

When the processes at step S208 and step S209, that is to say, the setting of the provisional job OS is successful, the controller 105a instructs the network controller 106a to switch the VLAN from the operation server 400a being the failed server to the provisional job OS (step S210). On the other hand, when the setting of the provisional job OS is failed, the controller 105a notifies the terminal device 700a of the failure of the setting of the provisional job OS (step S211).

Then, following step S210, the controller 105a instructs the image controller 107a to copy the backup image of the operation server 400a to the spare server (step S212). The image controller 107a copies the backup image to the spare server 200a according to the instruction (step S213).

On the other hand, when the provisional operation flag corresponding to the operation server 400a is turned off in the spare server table, the controller 105a instructs the image controller 107a to copy the backup image of the operation server 400a to the spare server (step S214). The image controller 107a copies the backup image to the spare server 200a according to the instruction (step S215).

Following the process at step S215, the controller 105a confirms the start of the spare server 200a (step S216). Subsequently, the controller 105a instructs the network controller 106a to switch the VLAN from the operation server 400a being the failed server to the spare server 200a (step S217). The network controller 106a controls the LAN switch 600a to switch the VLAN from the operation server 400a to the spare server 200a.

Meanwhile, steps S214 to S217 are intended to mean that the spare server 200a is immediately set up when the provisional job OS corresponding to the operation server 400a is not prepared.

Figure 13:
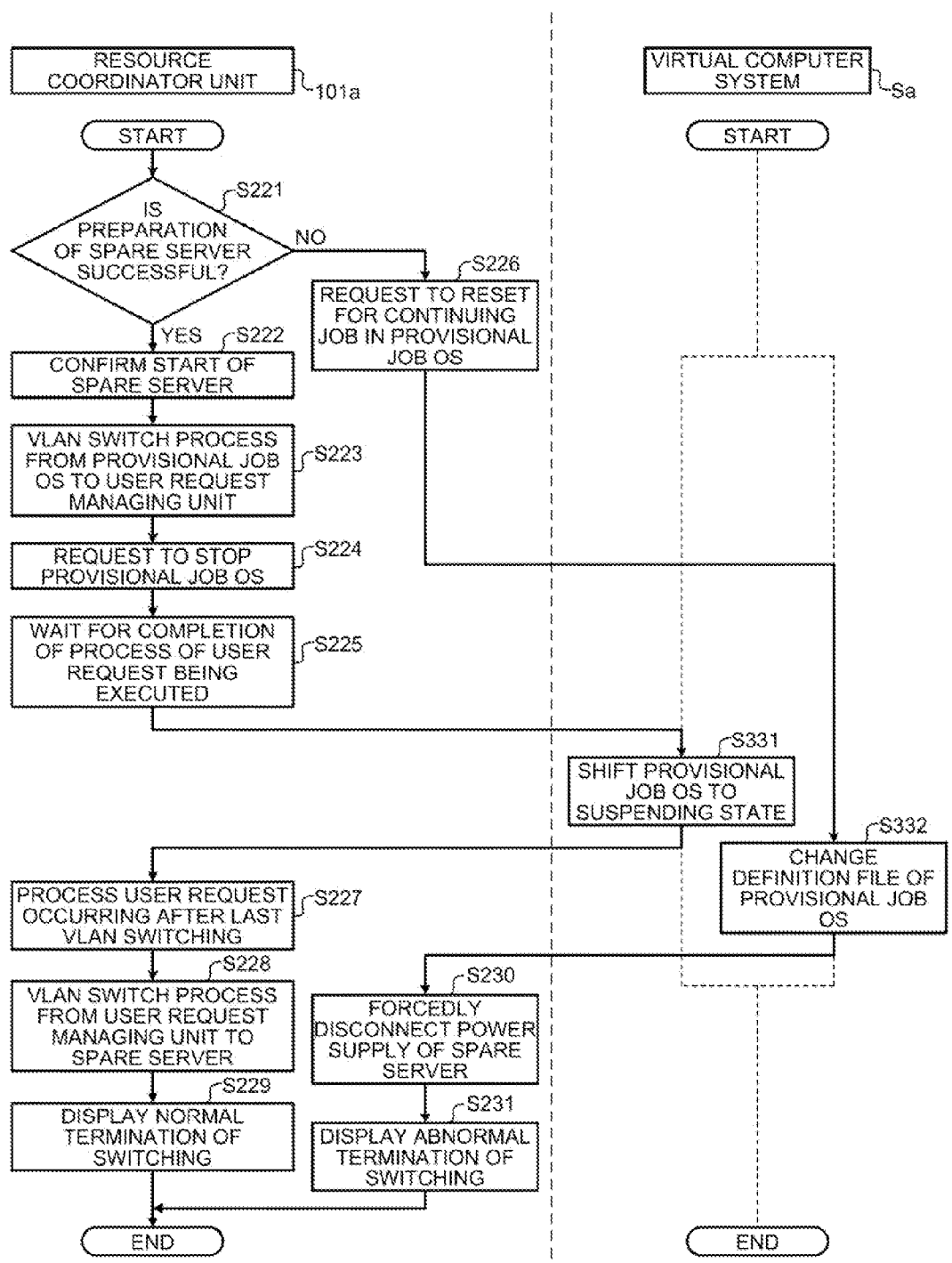
FIG. 13 is a flowchart illustrating a procedure of a process after completion of spare server preparation according to the second embodiment.

Procedure of Process After Completion of Spare Server Preparation According to Second Embodiment FIG. 13 is a flowchart illustrating a procedure of a process after completion of spare server preparation according to the second embodiment. The process after the completion of the spare server preparation is a process in which the spare server 200a takes over the job from the VM guest operating under the management of the virtualization software.

Assumption of execution of the procedure of the process after the completion of the spare server preparation is as follows. The virtualization software is installed into the virtual computer system Sa and the host OS, which may communicate with the resource coordinator unit 101a, exists. Also, the sufficient resource for starting the provisional job OS is available under the management of the virtualization software. Also, in the virtualization software, the resource assigned to the VM guest in the suspending state may be freely reassigned to another VM guest.

As illustrated in FIG. 13, in the resource coordinator unit 101a, the base unit 104a first judges whether the preparation of the spare server 200a of the operation server 400a is successful (step S221). The preparation of the spare server 200a is intended to mean the copy of the backup image to the spare server 200a. When it is judged that the preparation of the spare server 200a is successful (step S221: YES), the procedure shifts to step S222, and when it is not judged that the preparation of the spare server 200a is successful (step S221: NO), the procedure shifts to step S226.

At step S222, the base unit 104a confirms the start of the spare server 200a. Subsequently, the base unit 104a controls the network controller 106a and switches the VLAN from the provisional job OS to the user request managing unit 109a to sort the user request to the user request managing unit 109a (step S223).

Subsequently, the base unit 104a requires the host OS unit 108a1 of the VM host 108a to stop the provisional job OS (step S224). Subsequently, the controller 105a instructs the host OS unit 108a1 to wait for the completion of the process of the user request sorted to the provisional job OS (step S225). The host OS unit 108a1 of the virtual computer system Sa waits for the completion of the process of the user request according to the instruction from the controller 105a, then shifts the provisional job OS to the suspending state (step S331).

Following step S331, the user request managing unit 109a of the resource coordinator unit 101a transmits the user request accepted after the switching of the VLAN at step S223 to the spare server 200a (step S227). Subsequently, the base unit 104a switches the VLAN from the user request managing unit 109a to the spare server 200a and sorts the user request to the spare server 200a (step S228). Subsequently, the base unit 104a allows the terminal device 700a to display the normal termination of the switching from the operation server 400a to the spare server 200a (step S229).

On the other hand, at step S226, since the setup of the spare server 200a is not completed, the base unit 104a requires the VM host 108a to reset the definition file of the VM guest 200ai-1 such that the provisional job OS may continuously execute the job. Subsequently, the host OS unit 108a1 of the VM host 108a of the virtual computer system Sa changes the definition file of the VM guest 200ai-1 in which the provisional job OS operates (step S332). Specifically, the amount of the hardware resource assigned to the VM guest 200ai-1 is increased and processing performance of the VM guest 200ai-1 is improved, for example.

Following step S332, the base unit 104a of the resource coordinator unit 101a disconnects the power supply of the spare server 200a (step S230). Subsequently, the base unit 104a allows the terminal device 700a to display the abnormal termination of the switch from the operation server 400a to the spare server 200a (step S231).

Sequence Diagram Illustration Process After Completion of Spare Server Preparation According to Second Embodiment FIG. 14 is a sequence diagram illustrating the process after the completion of the spare server preparation according to the second embodiment. As illustrated in the drawing, the base unit 104a of the resource coordinator unit 101a first requests the network controller 106a to set up the spare server (step S241).

Subsequently, the network controller 106a requires the spare server 200a to set up the spare server (step S242). Subsequently, the spare server 200a sets up the spare server (step S243).

When the process at step S243 is abnormally terminated, in other words, when the setup of the spare server 200a is abnormally terminated, the base unit 104a sets job continuation in the provisional job OS in the controller 105a (step S244).

The controller 105a requests the VM host 108a to change the definition file of the VM guest 200ai-1 in which the provisional job OS operates according to the setting of the job continuation in the provisional job OS (step S245). The VM host 108a changes the definition file of the VM guest 200ai-1 according to the request to change the definition file.

Subsequently, the base unit 104a requires the spare server 200a to disconnect the power supply (step S246). The spare server 200a disconnects the power supply of its own device according to the request to disconnect the power supply (step S247). Subsequently, the base unit 104a confirms the power supply disconnection of the spare server 200a (step S248). Subsequently, the base unit 104a outputs an abnormal termination message of the switching from the operation server 400a to the spare server 200a to the terminal device 700a (step S249).

On the other hand, when the process at step S243 is normally terminated, in other words, when the setup of the spare server 200a is normally terminated, the base unit 104a first confirms the start of the spare server 200a (step S250). Subsequently, the base unit 104a requests the network controller 106a to switch the VLAN from the provisional job OS to the spare server 200a (step S251).

Subsequently, the network controller 106a, which receives the request to switch the VLAN, requires the LAN switch 600a to switch a destination of the user request from the provisional job OS to the user request managing unit 109a (step S252). The LAN switch 600a switches the destination of the user request from the provisional job OS to the user request managing unit 109a according to the request to switch the destination of the user request.

Subsequently, the base unit 104a requests the controller 105a to stop the provisional job OS (step S253). Subsequently, the controller 105a instructs the VM host 108a to wait for the completion of the process of the user request being executed (step S254). Subsequently, the VM host 108a waits for the completion of the process of the user request being executed in the VM guest 200ai-1 (step S255).

Subsequently, the controller 105a requires the VM host 108a to stop the provisional job OS (step S256). Subsequently, the VM host 108a stops the operation of the provisional job OS in the VM guest 200ai-1 (step S257). Subsequently, the base unit 104a requests the user request managing unit 109a to execute the user request after the switching of the VLAN at step S252 (step S258).

Subsequently, the user request managing unit 109a transmits the user request held by the user request managing unit 109a to the spare server 200a (step S259). The spare server 200a performs the process of the user request received from the user request managing unit 109a (step S260).

Subsequently, the base unit 104a requests the network controller 106a to switch the VLAN from the user request managing unit 109a to the spare server 200a such that the subsequent user request is sorted to the spare server 200a (step S261).

The network controller 106a requires the LAN switch 600a to switch the destination of the user request (step S262). The LAN switch 600a switches the destination of the user request from the user request managing unit 109a to the spare server 200a according to the request to switch the destination of the user request. Subsequently, the base unit 104a outputs the completion message of the switching from the operation server 400a to the spare server 200a to the terminal device 700a (step S263).

Effect of Second Embodiment

As described above, in the second embodiment, when the hardware failure occurs in the operation server 400a, the VM guest 200ai-1 is allowed to temporarily execute the job until the setup of the spare server 200a is completed. The operation of the VM guest 200ai-1 is started in a short time by the shift from the suspending state to the operating state. Therefore, the execution of the job is not stopped by the hardware failure of the operation server 400a and the continuity of the job may be improved and reliability of the redundant configuration of the job execution device in which the spare server 200a is associated with the operation server 400a may be improved.

In the second embodiment, a cooperation function with the virtualization software for realizing the virtual computer system and the image control software is added to the resource coordinator. Also, the cooperation function with the resource coordinator is added to the virtualization software for realizing the virtual computer system. Also, the user request managing unit 109a for temporarily managing the user request originally for the operation server 400a when switching the job execution device from the VM guest 200ai-1 in which the provisional job OS operates to the spare server 200a is added to the resource coordinator. In this manner, the reliability of the redundant configuration of the job execution device may be improved at a low cost by adding the function to the resource coordinator and the virtualization software.

Although the first and second embodiments are described above, the disclosed technology is not limited to them and may be carried out in various different embodiments. Especially, the embodiments may be carried out in an appropriated combination without contradiction. Also, the effect described in the embodiments is not limited to this.

Each component of each illustrated device is functionally and conceptually and is not necessarily required to be physically configured as illustrated. A specific mode of distribution or integration of each device is not limited to that illustrated and all or a part of the same may be functionally or physically distributed or integrated in an optional unit according to various loads and using states.

For example, in the first embodiment, the operation managing unit 101 and the virtual machine managing unit 108 may be integrated as one functional unit. Also, the controller 105 may be distributed into a creation instructing unit, a suspension shift instructing unit, and an operation shift instructing unit. Also, in the second embodiment, the resource coordinator unit 101a and the VM host 108a may be integrated as one functional unit. Also, the controller 105a may be distributed into the creation instructing unit, the suspension shift instructing unit, and the operation shift instructing unit.

Herein, the creation instructing unit instructs the virtual machine managing unit 108 to create the virtual machine 200-1 in which the job execution environment saved and copied to the memory device 300 by the saving/copying unit 107 operates on the computer hardware 200. Alternatively, the creation instructing unit instructs the VM host 108a to create the VM guest 200ai-1 in which the backup image saved and copied to the common storage 300a by the image controller 107a operates on the spare server 200a.

The operation shift instructing unit instructs the virtual machine managing unit 108 to start the virtual machine 200-1 created on the computer hardware 200 by the virtual machine managing unit 108 according to the instruction of the creation instructing unit and thereafter shift the same to the suspending state. Alternatively, the operation shift instructing unit instructs the VM host 108a to start the VM guest 200ai-1 created on the spare server 200a by the VM host 108a according to the instruction of the creation instructing unit and thereafter shift the same to the suspending state.

The operation shift instructing unit instructs the virtual machine managing unit 108 to shift the virtual machine 200-1 shifted to the suspending state to the operating state in which the provisional job executing unit 200-2 operates when the failure information from the operation device 400 is received. Alternatively, the operation shift instructing unit instructs the VM host 108a to shift the VM guest 200ai-1 shifted to the suspending state to the operating state in which the provisional job OS unit 200ai-3 operates when the failure information from the operation server 400a is received.

It is also possible to connect the virtual machine managing unit 108 and the VM host 108a through the network as external devices of the operation management device 100 and the operation management server 100a. It is also possible that another device has the virtual machine managing unit 108 and the VM host 108a and the function of the operation management device 100 and the operation management server 100a is realized by cooperation of the same through the network connection.

It is also possible to realize the operation management method by executing a program in which each process described in the first and second embodiments are prepared in advance by a personal computer and a work station. The program may be distributed through the network represented by the Internet.

The program may be recorded in a computer-readable recording medium represented by a hard disk, a flexible disk, a compact disk read only memory (CD-ROM), a magneto-optical disk (MO), and a digital versatile disk (DVD). The program may be executed by being read from the recording medium by the computer.

The program may also include following each procedure executed by each functional unit. A saving/copying procedure to save and copy the job execution environment operating in the operation device for executing the job to a predetermined memory device executed by the saving/copying unit 107 and the image controller 107a may be included.

Also, a creation instructing procedure to instruct the virtual machine management device to create the virtual machine in which the job execution environment saved and copied to a predetermined memory device operates on the predetermined computer hardware executed by the controllers 105 and 105a may be included.

Meanwhile, when there is difference between the job execution environment newly saved and copied to the predetermined memory device and the job execution environment previously saved and copied, the creation instructing procedure deletes the virtual machine in which the job execution environment previously saved and copied operates. Then, the creation instructing procedure may instruct the virtual machine management device to newly create the virtual machine in which the job execution environment newly saved and copied operates on predetermined computer hardware.

It is also possible to include a suspension shift instructing procedure to instruct the virtual machine management device to start the virtual machine created on the predetermined computer hardware and thereafter shift the same to the suspending state executed by the controllers 105 and 105a.

It is also possible to include a failure information receiving procedure to receive the failure information transmitted from the operation device executed by the failure information receiving unit 103 and the SNMP analyzing unit 103a. It is also possible to include the operation shift instructing procedure to instruct the virtual machine management device to shift the virtual machine shifted to the suspending state to the operating state in which the job execution environment operates when the failure information is received executed by the controllers 105 and 105a.

It is also possible to include a switching procedure to switch from the operation device to the virtual machine shifted to the operating state to continue the execution of the job executed by the switching unit 106 and the network controller 106a. Meanwhile, the switching procedure may switch from the virtual machine to the spare device to continue the execution of the job when the start of the job execution environment is completed in the spare device by the spare device starting procedure.

Also, the switching procedure may suspend switching from the virtual machine to the spare device until the process of the processing request from the terminal device of the user already transmitted to the virtual machine is completed when switching from the virtual machine to the spare device to continue the execution of the job. Also, when the start of the job execution environment is not completed in the spare device, the switching procedure may continue the execution of the job in the virtual machine and instruct the virtual machine management device to preferentially assign the resource of the predetermined computer hardware to the virtual machine.

It is also possible to include a spare device setting procedure to set the spare device for the operation device in the spare device table executed by the controllers 105 and 105a. It is also possible to include a spare device starting procedure to copy the job execution environment operating in the operation device to the spare device and thereafter start the job execution environment copied to the spare device to start the operation when the failure information is received executed by the controllers 105 and 105a.

It is also possible to include a processing request managing procedure to temporarily accept and manage the processing request from the terminal device of the user from start to completion of the switching from the virtual machine to the spare device and to transmit the processing request to the spare device when the switching from the virtual machine to the spare device is completed executed by the user request managing unit 109a.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable, non-transitory medium storing an operation management program causing a computer to execute a process comprising:
copying execution conditions of an operation to a storage device, the operation being executed on a first computer;
creating a virtual machine on a second computer and copying the execution conditions of the operation to the second computer;
first activating the virtual machine with the execution conditions of the operation on the second computer and making the virtual machine to a suspending state;
when receiving failure information of the operation on the first computer, second activating the suspended virtual machine with the execution conditions of the operation,
temporarily making the virtual machine take over execution of the operation during copying the execution conditions of the operation to a spare device for the first computer and starting the execution conditions of the operation copied to the spare device to start the operation, and switching from the virtual machine to the spare device to continue execution of the operation when the start of the execution conditions of the operation is completed in the spare device, wherein the making includes, when the starting of the execution conditions of the operation is not completed in the spare device, continuing the execution of the operation in the virtual machine and increasing an assigned amount of a resource of the second computer to the virtual machine.

2. The computer-readable, non-transitory medium according to claim 1, wherein the process further comprises:
setting the spare device for the first computer in a spare device table.

3. The computer-readable, non-transitory medium according to claim 1, wherein
the creating includes, when there is difference between the execution conditions of the operation newly copied to the storage device and the execution conditions of the operation previously copied, deleting the virtual machine with the execution conditions of the operation previously copied from the second computer and newly creating the virtual machine with the execution conditions of the operation newly copied on the second computer.

4. The computer-readable, non-transitory medium according to claim 1, wherein the process further comprises temporarily accepting to- save a processing request from a terminal device of a user from start to completion of switching from the virtual machine to the spare device, and transmitting the processing request to the spare device when the switching from the virtual machine to the spare device is completed.

5. The computer-readable, non-transitory medium according to claim 4, wherein the process further comprises suspending the switching from the virtual machine to the spare device until a process of the processing request from the terminal device of the user already transmitted to the virtual machine is completed when switching from the virtual machine to the spare machine to continue execution of the operation.

6. The computer-readable, non-transitory medium according to claim 1, wherein the process further includes creating a virtual machine management device that executes the creating, the first activating and the second activating.

7. An operation management device, comprising:
a processor coupled to a memory,
wherein the processor is configured to manage operation of a device by executing a process including:
copying execution conditions of an operation to a storage device, the operation being executed on a first computer;
creating a virtual machine on a second computer and copying the execution conditions of the operation to the second computer;
first activating the virtual machine with the execution conditions of the operation on the second computer and making the virtual machine to a suspending state;
when receiving failure information of the operation on the first computer, second activating the suspended virtual machine with the execution conditions of the operation,
temporarily making the virtual machine take over execution of the operation during copying the execution conditions of the operation to a spare device for the first computer and starting the execution conditions of the operation copied to the spare device to start the operation, and switching from the virtual machine to the spare device to continue execution of the operation when the start of the execution conditions of the operation is completed in the spare device, wherein when the starting of the execution conditions of the operation is not completed in the spare device, the making includes continuing the execution of the operation in the virtual machine and increasing an assigned amount of a resource of the second computer to the virtual machine.

8. The operation management device according to claim 7, the process further comprising:
setting the spare device for the first computer in a spare device table.

9. The operation management device according to claim 7, wherein
when there is difference between the execution conditions of the operation newly copied to the storage device and the execution conditions of the operation previously copied, the creating includes deleting the virtual machine with the execution conditions of the operation previously copied from the second computer and newly creating the virtual machine with the execution conditions of the operation newly copied on the second computer.

10. The operation management device according to claim 7, the process further comprising temporarily accepting to save a processing request from a terminal device of a user from start to completion of switching from the virtual machine to the spare device, and transmitting the processing request to the spare device when the switching from the virtual machine to the spare device is completed.

11. The operation management device according to claim 10, wherein
the process further comprises suspending the switching from the virtual machine to the spare device until a process of the processing request from the terminal device of the user already transmitted to the virtual machine is completed when switching from the virtual machine to the spare machine to continue execution of the operation.

12. An operation management method performed by an operation management device for managing operation of a device, comprising:
copying execution conditions of an operation to a storage device, the operation being executed on a first computer;
creating a virtual machine on a second computer and copying the execution conditions of the operation to the second computer;
first activating the virtual machine with the execution conditions of the operation on the second computer and making the virtual machine to a suspending state;
when receiving failure information of the operation on the first computer, second activating the suspended virtual machine with the execution conditions of the operation,
temporarily making the virtual machine take over execution of the operation during copying the execution conditions of the operation to a spare device for the first computer and starting the execution conditions of the operation copied to the spare device to start the operation, and
switching from the virtual machine to the spare device to continue execution of the operation when the start of the execution conditions of the operation is completed in the spare device, wherein
the making includes, when the starting of the execution conditions of the operation is not completed in the spare device, continuing the execution of the operation in the virtual machine and increasing an assigned amount of a resource of the second computer to the virtual machine.

13. The operation management method according to claim 12, further comprising:
   setting the spare device for the first computer in a spare device table.

14. The operation management method according to claim 12, wherein,
   the creating includes, when there is difference between the execution conditions of the operation newly copied to the storage device and the execution conditions of the operation previously copied, deleting the virtual machine with the execution conditions of the operation previously copied from the second computer and newly creating the virtual machine with the execution conditions of the operation newly copied on the second computer.

15. The operation management method according to claim 12, further comprising temporarily accepting to save a processing request from a terminal device of a user from start to completion of switching from the virtual machine to the spare device, and transmitting the processing request to the spare device when the switching from the virtual machine to the spare device is completed.

16. The operation management method according to claim 15, further comprising suspending the switching from the virtual machine to the spare device until a process of the processing request from the terminal device of the user already transmitted to the virtual machine is completed when switching from the virtual machine to the spare machine to continue the execution of the operation.

* * * * *